(12) United States Patent
Zedell et al.

(10) Patent No.: US 10,984,460 B2
(45) Date of Patent: Apr. 20, 2021

(54) MEDIUM, METHOD AND APPARATUS FOR NATIVE PAGE GENERATION

(71) Applicant: Under Armour, Inc., Baltimore, MD (US)

(72) Inventors: Jeremy Zedell, Austin, TX (US); Murtaza Nemat Ali, Austin, TX (US); Ben Finnigan, Baltimore, MD (US); Mary Lawyer, Baltimore, MD (US)

(73) Assignee: Under Armour, Inc., Baltimore, MD (US)

( * ) Notice: Subject to any disclaimer, the term of this patent is extended or adjusted under 35 U.S.C. 154(b) by 669 days.

(21) Appl. No.: 15/664,260

(22) Filed: Jul. 31, 2017

(65) Prior Publication Data

US 2018/0108069 A1    Apr. 19, 2018

Related U.S. Application Data

(60) Provisional application No. 62/408,214, filed on Oct. 14, 2016.

(51) Int. Cl.
*G06Q 30/00* (2012.01)
*G06Q 30/06* (2012.01)
*G06F 16/957* (2019.01)
*G06F 16/958* (2019.01)

(52) U.S. Cl.
CPC ..... *G06Q 30/0631* (2013.01); *G06F 16/9577* (2019.01); *G06F 16/972* (2019.01)

(58) Field of Classification Search
CPC ..................................... G06Q 30/0601–0645
USPC .............................................. 705/26.1–27.2
See application file for complete search history.

(56) References Cited

U.S. PATENT DOCUMENTS

| | | |
|---|---|---|
| 6,341,316 B1 | 1/2002 | Kloba et al. |
| 7,509,374 B2 | 3/2009 | Trinh et al. |
| 7,890,578 B2 | 2/2011 | Cheng et al. |
| 8,015,213 B2 | 9/2011 | Dunietz et al. |
| 8,213,924 B2 | 7/2012 | Makavy et al. |
| 8,818,349 B2 | 8/2014 | Klassen et al. |
| 8,918,712 B2 | 12/2014 | Nario et al. |
| 8,938,726 B2 | 1/2015 | Barak |
| 2008/0276182 A1 | 11/2008 | Leow |

(Continued)

OTHER PUBLICATIONS

Bleacher report enters tablet space with the launch of team stream app and HTML experience for the iPad: Independent sports media site sees mobile as big driver for company growth and innovation. (Jan. 19, 2012). PR Newswire Retrieved from https://dialog.proquest.com/professional/docview/916713367?accountid=131444.*

*Primary Examiner* — Resha Desai

(74) *Attorney, Agent, or Firm* — Law Office of Mark Wang, P.C.

(57) ABSTRACT

Methods, apparatus, computer applications, and systems are provided for enabling identification of content to be compiled into a shopping application at a user device. In one embodiment, a general layout for a number of content modules to be displayed and identifying information for content to be inserted are provided from a network server to a user device, the user device then calls the appropriate content and utilizes the layout to generate a page for display to the user natively. One specific variant, activity and profile data collected at the user device via a separate application may be stored at the network and used to select content by the server.

19 Claims, 12 Drawing Sheets

(56) References Cited

U.S. PATENT DOCUMENTS

| | | |
|---|---|---|
| 2009/0172696 A1 | 7/2009 | Meliksetian et al. |
| 2009/0241135 A1 | 9/2009 | Wong et al. |
| 2010/0153187 A1* | 6/2010 | Ghani ................ G06Q 30/0204 |
| | | 705/14.53 |
| 2011/0113090 A1 | 5/2011 | Peeri |
| 2012/0047425 A1 | 2/2012 | Ahmed |
| 2013/0246169 A1 | 9/2013 | Berry et al. |
| 2014/0026086 A1 | 1/2014 | Zuverink et al. |
| 2014/0089134 A1* | 3/2014 | Linh ...................... G06Q 20/12 |
| | | 705/26.7 |
| 2014/0095589 A1 | 4/2014 | Johnson |
| 2014/0280477 A1 | 9/2014 | Chiussi et al. |
| 2014/0282032 A1 | 9/2014 | Brown et al. |
| 2015/0220492 A1 | 8/2015 | Simeonov et al. |
| 2015/0348126 A1 | 12/2015 | Baiya et al. |
| 2016/0103675 A1 | 4/2016 | Aabye et al. |
| 2016/0125314 A1 | 5/2016 | Mulukutla et al. |
| 2016/0189248 A1 | 6/2016 | Boyle |
| 2016/0253710 A1* | 9/2016 | Publicover .......... G06F 16/2358 |
| | | 705/14.66 |

\* cited by examiner

MEDIUM, METHOD AND APPARATUS FOR NATIVE PAGE GENERATION

PRIORITY AND RELATED APPLICATIONS

The present application claims priority to U.S. Provisional Patent Application Ser. No. 62/408,214 of the same title, filed on Oct. 14, 2016, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present disclosure relates to the field of native page generation in a mobile application. More particularly, the present disclosure relates to methods, devices, systems, and computer programs for utilizing a mobile application which generates pages thereof natively based on instruction and information received from a network server.

BACKGROUND

The background description provided herein is for the purpose of generally presenting the context of the disclosure. Unless otherwise indicated herein, the materials described in this or any section of the disclosure are not prior art to the claims in this application and are not admitted to be prior art by inclusion herein.

Recent advancements in electronics technology has led to the widespread use of portable devices which are able to run computer applications thereon. Accordingly, a wide variety of applications have been developed for mobile devices which take advantage of the advanced processing power of the current devices. One specific application type includes a shopping feature, whereby users may identify and purchase goods. A user may open a so-called shopping app, and review items for purchase such as by searching for particular items or types of items. Such applications are generally developed and compiled at a network server then downloaded to the device for execution as a searchable list of available items. The resultant display is therefore merely a display of the web based content in its original format and layout.

Hence, what is needed is a means for providing native page generation for mobile applications. Ideally, such methods and apparatus would utilize content selected based on previously collected activity and profile data relating to the user and enable delivery of additional content types. Apparatus and methods for accomplishing the foregoing are provided in the present disclosure.

SUMMARY OF THE DISCLOSURE

The present disclosure addresses the foregoing needs by disclosing, inter alia, methods, devices, systems, and computer programs for enabling native page generation.

Specifically, methods, apparatus, computer applications, and systems are provided to enable identification of targeted content to be compiled into a shopping application at a user device. In one embodiment, a general layout for a number of content modules to be displayed and identifying information for content to be inserted are provided from a network server to a user device, the user device then calls the appropriate content and utilizes the layout to generate a page for display to the user natively. One specific variant, activity and profile data collected at the user device via a separate application may be stored at the network and used to select content by the server.

These and other aspects of the disclosure shall become apparent when considered in light of the disclosure provided herein.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

All Figures © Under Armour, Inc. 2017. All rights reserved.

DETAILED DESCRIPTION

Exemplary Embodiments

Disclosed embodiments include systems, apparatus, methods and storage medium associated with content generation and delivery in general, and in particular enabling native content generation of web pages at a client device.

In the following detailed description, reference is made to the accompanying drawings which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "comprising," "including," "having," and the like, as used with respect to embodiments of the present disclosure, are synonymous.

Network Architecture

Figure 1:
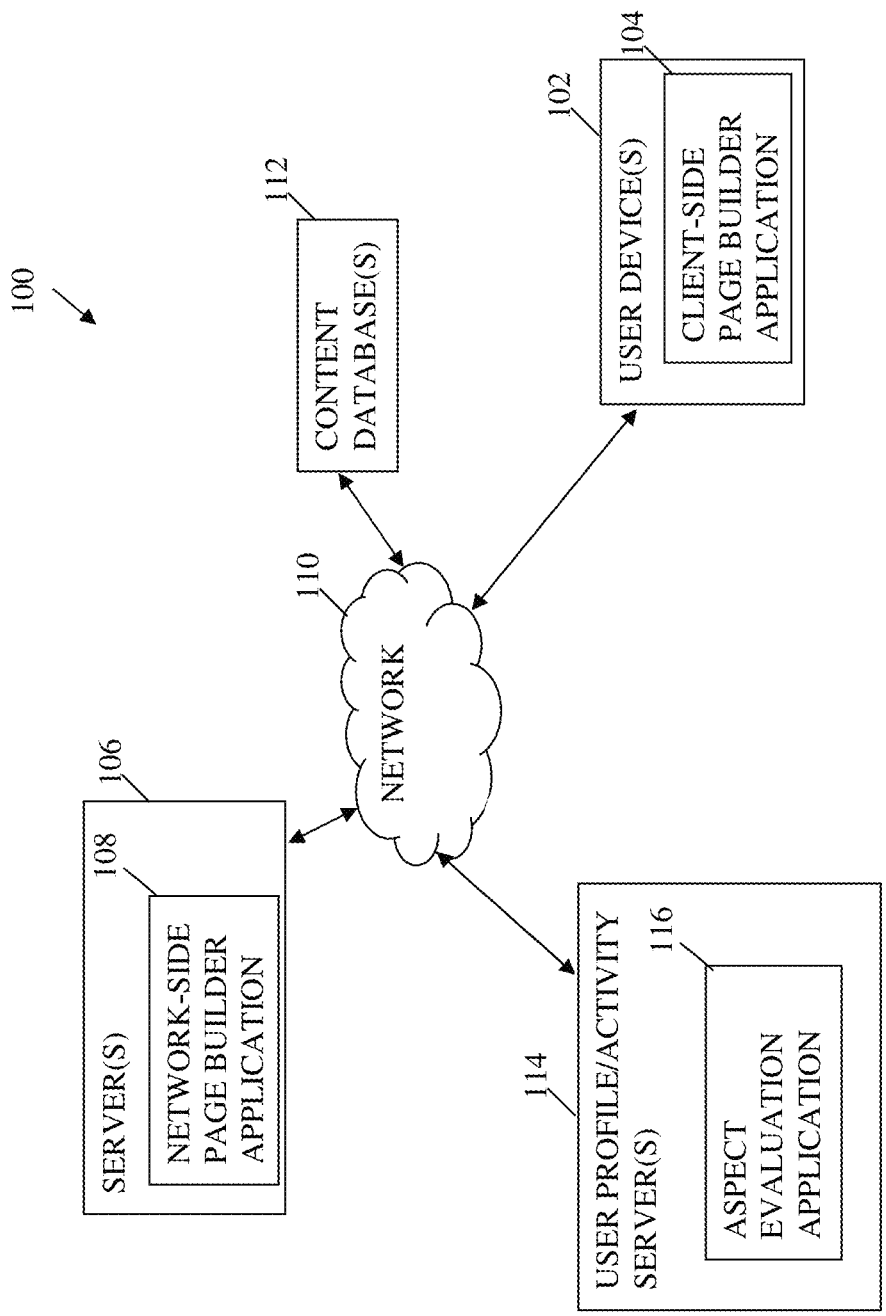
FIG. 1 is a block diagram illustrating an exemplary network for enabling native page generation in accordance with one embodiment of the present disclosure.

Referring now to FIG. 1, an exemplary network 100 for native page generation in accordance with one embodiment of the present disclosure is illustrated. It is appreciated that although a web browser may build natively-viewable content from remotely accessed structured content, this is not the subject of the present disclosure nor considered "native content" despite being contained in a native object. Rather, the present disclosure relates primarily to content and/or pages of an application that are assembled at the user device as discussed in further detail below.

As shown, the network 100 generally comprises one or more user devices 102 and one or more network servers 106 in communication with one another via at least a network 110. As shown, the user devices 102 are generally configured to execute a client-side page builder application 104 thereon and the server apparatus 106 are generally configured to execute a network-side page builder application 108 thereon. The client-side page builder application 104 provides functionality to enable native page generation at the client device 102, as discussed in further detail below. Also discussed in detail below, the network-side page builder application 108 provides functionality to enable the server apparatus 106 to appropriately instruct the client device 102 in order to assist it in building native pages.

The user device 102 (or client device) comprises a stationary or portable computing apparatus which is configured to run a plurality of software applications thereon (as discussed in detail below) and/or access a web-based application. For example, the user device 102 may comprise a desktop computer (such as those available from Dell Computing of Austin, Tex.), or smartphone, computing tablet, laptop computer, electronic reader, personal digital assistant, and so forth. Exemplary embodiments include e.g., Galaxy S4® from Samsung Electronics of Seoul, Korea, iPhone® or iPad® from Apple Computer of Cupertino, Calif.

In another embodiment, the user device 102 may be further configured to track user activity by running or being configured to access (such as via a web-browser) heath-monitoring applications (not shown) such as e.g., UA Record™, MapMyFitness®, MyFitnessPal®, Endomondo®, etc. each owned by assignee hereof. Other health activity related monitoring applications may additionally be utilized in connection with the present disclosure, such as those specifically designed to receive information from a particular health monitoring device. For example, an application which is published by a specific sensor device manufacturer may be accessed by the user device 102. The foregoing application examples are merely representative of the general concepts of the present disclosure and are not to be considered limiting to the overall scope of the disclosure.

Alternatively, the user device 102 may be in communication with one or more activity monitoring devices configured to track user activity such as e.g., portable computing devices designed to measure, sense, monitor, or otherwise receive biometric, environmental, and/or activity parameters. In one variant, the activity monitoring devices may comprise wearable health-related parameter measurement and computing devices, such as e.g., a smart watch, an activity tracker, a heart rate monitor, a step tracking device, smart shoe(s), and/or smart eyeglasses. In addition, an activity monitoring devices may comprise smart phones having one or more of the foregoing capabilities and/or which enables manual entry of the foregoing parameters by the user thereof.

In a further embodiment, the herein described functionality of the activity monitoring device and the user device 102 is provided in a single device. For example, a single smart phone, smart watch, or other portable electronic device may be configured to both monitor user activity (such as via one or more sensors and/or inputs) as well as access or run a computer application configured to provide data relating to the activity to the user (such as e.g., the aforementioned UA Record™, MapMyFitness®, MyFitnessPal®, Endomondo®, etc.) and generate native content with respect to at least one application running thereon.

The activity monitoring devices (which the user device 102 may comprise or be in communication with) generally monitor activity of the wearer/user. For example, an activity tracking device is configured to collect activity data such as steps taken, distance travelled, rate or pace of a run, and/or flights of stairs climbed, etc.; a heart rate monitor is configured to collect heartbeat data; a step tracking device collects data relating to a number of steps taken by the user/wearer; similarly smart shoes and smart eyeglasses may collect data relating to steps, distance, pace, and/or flights of stairs climbed. Furthermore, a smart watch and/or smart phone, may be utilized as an activity tracking device, a heart rate monitor, and/or step tracking device. In one embodiment, several individual activity monitoring devices may be utilized by a single user during a given activity; for example, activity data may be collected from a user's smart phone, smart shoes and step tracking band.

In a further embodiment, the activity monitoring devices (which the user device 102 may comprise or be in communication with) may include Global Positioning System (GPS) devices, sensors, receivers, etc. for use in determining a user's geographic location. In one variant, the aforementioned GPS components may be utilized to provide information relating to a nearness of the user to a particular store or a type of store. According to this example, when the user is near a particular store or type of store, pages relating specifically to goods/services provided at that particular store and/or a similar type of store or store providing similar goods/services may be provided when the application is launched.

In another embodiment, the activity monitoring devices (which the user device 102 may comprise or be in communication with) may include one or more environmental sensors to identify existing weather conditions, etc. In another variant, the monitoring devices may obtain the aforementioned environmental information from a separate or distinct service, such as another application running on the device, a third party server, etc. In either instance, the weather or environmental information may be further utilized to enable selection of particular content applicable to that climate or weather condition, e.g., cold weather would indicate to provide cards or pages within the application relating to cold weather gear, training practices, etc.

In addition, the user device 102 is configured to run one or more applications which are comprised in whole or in part of content generated at the user device (i.e., natively) via the client-side builder application 104. As discussed in greater detail elsewhere herein, the applications which utilize natively generated content may include e.g., a shopping application, a social media application, an editorial or informational application, a health monitoring application, and/or any combination of the features of these types of applications.

The server device 106 comprises a computerized device or data processing system configured to run one or more software applications on a processor thereof (e.g. the network-side page builder application 108). As discussed in greater detail elsewhere herein, the server device 106 is configured to access data stored at the content databases 112 and communicate with the profile/activity servers 114 in order to derive instructions for generating content at the user device 102.

The network 108 which enables communication between the user device(s) 102, server(s) 106, content database(s) 112, and the user activity and profile server(s) 114, may comprise a wired and/or wireless, private and/or public network, including e.g., the Internet. Accordingly, each of the user device(s) 102, server(s) 106, content database(s) 112, and the user activity and profile server(s) 114 is configured with appropriate networking communication interfaces (not shown). An example of wired communication interface may include, but is not limited to, Ethernet; while examples of wireless communication interfaces may include, but are not limited to, near field communication (NFC), Bluetooth, WiFi, 4G or 5G LTE. It is further appreciated that various gateways, routers, switches, base stations, and so forth may be placed between the communication interfaces of foregoing devices.

As discussed, the user devices 102 and servers 106 are further configured to communicate with a plurality of content databases 112 and a plurality of user profile/activity servers 114 via the network 110. The plurality of content databases 112 comprise one or more databases or data warehouses configured to store content relating to items for sale, in one embodiment. The content may comprise a plurality of data records each record comprising e.g., images, metadata, identifiers, videos, and/or editorial content (such as articles containing text and images). Each record may be provided with a unique identifier which may be utilized to reference the content as discussed elsewhere herein. In one variant, the unique identifier may comprise a uniform resource locator (URL).

The user profile/activity servers 114 may comprise or be in communication with one or more databases each specifically dedicated to storing profile data and/or activity data. According to this embodiment, certain apparatus comprise profile databases while others comprise activity databases. Information specific to individual ones of a plurality of users is uniquely identified by the user activity and profile servers 114 via a query of the associated data stores or databases using a unique user profile identifier, user device 102 identifier, or other unique identifier.

The profile databases comprise data stores or tables wherein information relating to each user is stored. The stored information may include individual data records for each user comprising information relating to the user's contact information (e.g., email, geographic location, etc.), physiological parameters (e.g., gender identity, weight, height, etc.), goals, and other information relating to each registered user. In addition, these data records may include the user's known interests, such as e.g., running, yoga, basketball, etc.; as well as the user's inspirational figures and celebrities of interest. It is noted that, in one variant, the user's sex may be divided into two separate categories, one to identify the user's biological gender (i.e., determined at birth) and the other to identify the user's gender identity (i.e., that to which he/she associates him/herself irrespective of biological gender). The records may be anonymized using a cryptographic hash of the user's identifying information (such as user identifier, email address, etc.).

The activity databases comprise data stores or tables wherein information relating to the sensed or collected activity of each user is stored. In one embodiment, the user activity database stores raw or calibrated data having one or more identifiers associated thereto. The identifiers provide information which associates the data to e.g., a particular workout (such as by date/time), a particular user profile, and/or a particular user device. In one exemplary embodiment as health/activity data is generated at the monitoring devices, it is provided simultaneously to the user activity database and to the user device 102 to which the user is associated. For example, the stored data may include e.g., steps, activity, sleep, nutrition, etc. The data may be temporarily held at an activity database in one embodiment; then after a predetermined length of time, transitioned to a permanent storage entity (not shown). In another embodiment, the data may be identified such as by a tag or other identifier as to the source and/or type of data. For example, data records may be individually tagged as being collected from an activity tracking device, a heart rate monitor, a sleep tracking device, a nutrition tracking device, etc. Additionally or in the alternative, the collected data records may be tagged as step data, nutrition data, heart rate data, sleep data, etc. In a further embodiment, additional data is collected at an activity database relating to specific device usage. In other words, the databases may collect information relating to the date/time of last use of each device or application such as via utilization of a date/timestamp.

In further embodiment, the user profile/activity server 114 comprises a computerized device or data processing system configured to run one or more software applications on a processor thereof (e.g. the aspect evaluation application 116). As discussed in greater detail elsewhere herein, the user profile/activity server 114 is configured to access data stored at the profile/activity databases in order to identify content targeted to the user device 102.

In yet another embodiment, a single centralized database for storing information specific to a user including activity and profile data may be utilized such as that described in co-owned, co-pending U.S. patent application Ser. No. 15/002,036 filed on Jan. 20, 2016 and entitled "Methods and Apparatus for Account Linking", incorporated herein by reference in its entirety. As discussed therein, a single user is able to link one or more health-monitoring applications such that he/she is able to sign on once and effect changes in more than one application. Specifically, a single user device 102 is configured to run a plurality of heath-monitoring applications which collect data from a respective plurality of health-monitoring devices and/or via user entry; once the applications are linked, the user accesses, views, and analyzes the plurality of health-related data from the plurality of applications at a single application. In this manner, the user's activity and updated information entered, sensed, or otherwise collected into or by one application may be accessible at the other applications for analysis and display therein as well.

The apparatus and entities disclosed above and illustrated in FIG. 1 may be utilized for enabling native content generation at a user device 102 in association with the present disclosure, such as via the methods disclosed below.

Exemplary Methods

Figure 2:
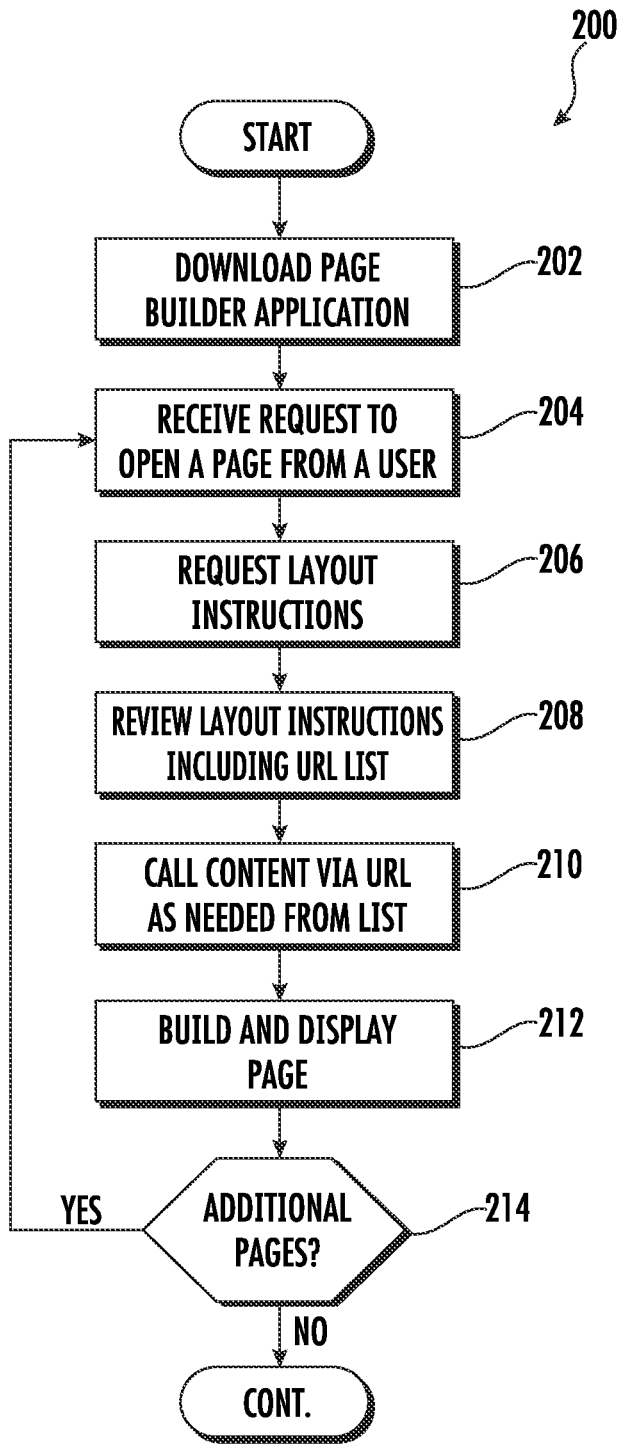
FIG. 2 is a logical flow diagram illustrating an exemplary method for enabling native page generation in accordance with one embodiment of the present disclosure.

Referring now to FIG. 2, a generalized method 200 for enabling native content generation at a user device 102 is shown. In one exemplary embodiment, the herein discussed method 200 is performed at one or more processes of the user device 102 (as discussed in further detail below with respect to FIG. 4). However, it is appreciated that one or more steps of the method 200 may be performed with the assistance of one or more processes at the server apparatus 106 or other data storage entities (such as the content database(s) 112 and/or the user profile/activity server(s) 114).

Per step 202 of the method 200, the page builder application 104 is downloaded to the user device 102. In one embodiment, the page builder application 104 may be included within a suite of instructions configured to provide additional client-facing functionality. For example, the page builder application 104 may be associated to a shopping application in one embodiment. In another embodiment, the page builder application 104 may be associated to a health-monitoring application. It is appreciated that any number of applications may utilize the native content generation or page builder application 104 functionality discussed herein, the foregoing shopping and/or health-monitoring applications being merely exemplary of the broader concepts provided herein.

It is further appreciated that in another embodiment, the page builder application 104 may be pre-installed at the user device 102 therefore eliminating a need for downloading thereof (step 202).

Per step 204, a request to open a page is received from a user at the page builder application 104 of the user device 102. The request may comprise a general request, such as a request to generally open the application, and the page which is loaded comprises a home screen or page. The request may, alternatively, comprise a request to open a specific page for example a search page, a women's apparel page, a new arrivals page, a workout log page, a sleep comparison page, etc.

Next, at step 206, in response to the request to open a page, the page builder application 104 requests layout instructions for the requested page from the network-side page builder application 108. As discussed elsewhere herein, the layout for each page or type of page is determined by an operator at e.g., a network server 106. The operator may select from a plurality of module types to build a page model or outline that is populated by the client-side page builder application 104. The module types may comprise e.g., editorial content, audio/video content, item sales information, item description information, etc. as discussed below. The layout instructions provide an outline of where each content module will appear on a page as well as certain static text and images (e.g., titles, background images, etc.). For each content module, the layout instructions include a URL directing the device to the appropriate content. In one embodiment, the URL are placed within the layout outline; alternatively, a separate list of URL may be provided such that the items in the list are placed into the order they are needed for building the page.

The specific content to be placed on the page is defined in the layout instructions, it is noted, however, that the content itself may be identified using e.g., the methods discussed below with respect to FIGS. 3A and 3B.

At step 208, a review of the layout for the page or page type is performed, including a review of the URLs and/or URL list. Based on this review, the content is called (via the URL) as needed, per step 210. In one embodiment, the URL list is utilized in the order it is provided such that the layout dictates a type of content needed, the content is placed in order in the list so that the page builder 104 does not require any further processing or logic to simply call the content via the list and place it at the position within the page (step 212). The order for the list may take into account content which appears on the page that is not the result of a search as well as content which results from a search. In another variant, the page builder application 104 receives several lists, one for each type of content requested. According to this variant, the page builder application 104 must transition between lists to pull appropriate content in order to build each page (step 212) based on type of content needed (as dictated by the layout of the page).

If additional pages are opened by the user (step 214), the method 200 repeats at step 204. As discussed, the page request is received (step 204), the layout instructions requested (step 206) and reviewed (step 208), and the content is requested (step 210) and received so that the page may be built (step 212).

The additional pages may comprise pages relating to the originally presented page. For example, the first presented page may comprise a summary content module relating to a particular product for sale in a shopping application. According to this example, the user may interact with the first content module (such as by clicking or touching on the module) to cause a second page to be provided. In this case, the second page comprises a specific detailed product page outlining e.g., sizes, colors, additional product details, etc. According to this variant, rather than the method 200 repeating at step 204, metadata in the selected content module provides appropriate location and identification of the detailed product page (such as a URL or other appropriate link). In another variant, the interaction may comprise selection of a button or other indicator to purchase the item, such interaction may immediately or upon selection of a further button or icon, cause the application to load a "shopping cart" page. According to this variant, the data required to build the shopping cart is obtained from the user's interactions and therefore does not require repetition of the method 200 as discussed above.

Figure 3A:
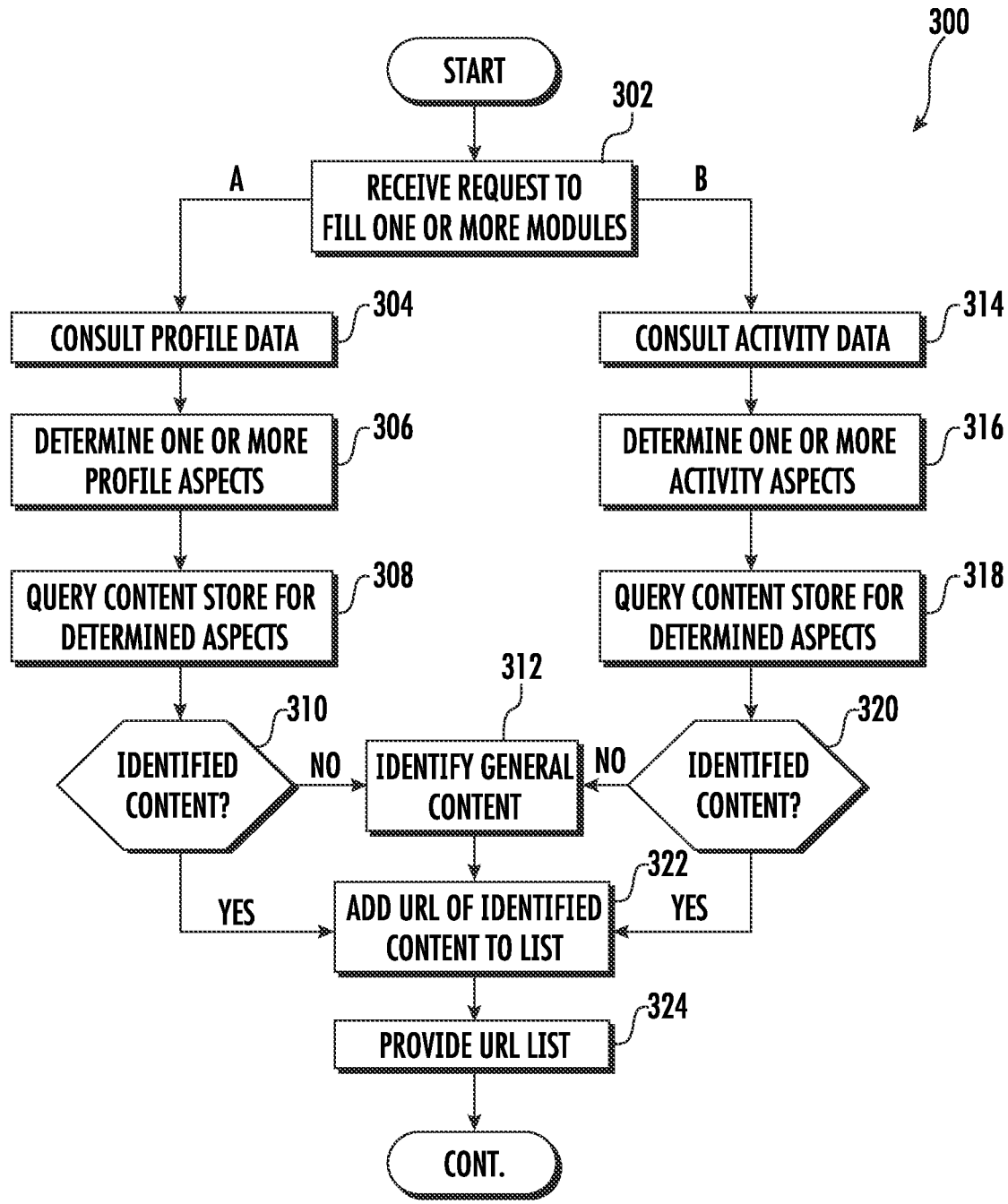
FIG. 3A is a logical flow diagram illustrating an exemplary method for identifying content in association with the assembly of native pages in accordance with one embodiment of the present disclosure.

Referring now to FIG. 3A, an exemplary method 300 for identifying content in association with the assembly of native pages as discussed in FIG. 2 is disclosed. Specifically, FIG. 3A discloses a method for selecting appropriate content based on the layout determination at step 206 of the method 200 of FIG. 2. It is appreciated that the method 300 may be performed by one or more processes running at the activity/profile server 114 (such as at the aspect evaluation process 116). In another embodiment, the method 300 may be performed by one or more processes running at the user device 102 and/or the network server 106. It is further appreciated, that one or more steps of the method 300 may be performed at other processing devices in communication with the foregoing server 114 (and/or other device) and/or may occur with the assistance of one or more data storage entities (such as the content database(s) 112 and/or the user profile/activity databases).

As shown, per step 302, a request is received to fill one or more modules. As noted above, the request is derived from an operator upon building a page (such as via the network-side page builder application 108; discussed in greater detail elsewhere herein). In one embodiment, the request comprises at least (i) user and/or device specific information and (ii) page specific information. The user and/or device specific information may include: information identifying the user him/herself, such as a user identifier, and information identifying the requesting user device 102, such as a device identifier. The page specific information may include: the number of content modules needed, and the type of each content module needed.

The method 300 continues down two pathways, labeled A and B in FIG. 3A. It is appreciated that the two pathways may be executed simultaneously or in series.

Per pathway A, at step 304 profile data is consulted. In one embodiment, this is accomplished by reviewing the user and/or device specific information against data in a profile database (such as the user activity/profile database 114). The user and/or device identifier is compared to those stored in the database to identify the particular user and/or device. Then, based on the stored profile data associated to that user or device, one or more profile aspects are determined (step 306). For example, it may be determined that the user is a male age 35 who lives in Austin, Tex. and has interest in basketball and running. Additionally, it may be determined that in the six months, the user has not purchased new running shoes. In one variant, the determined profile aspects may be stored or saved locally at the user device 102 (or other device in communication therewith) thereby eliminating the need to perform steps 304-306 at each page building instance and thus facilitating quicker response time in building the application pages.

Using the determined aspects, the process queries one or more content databases 112 at step 308. In one exemplary embodiment, the query may contain one or more content requests; such as: content directed to men, content for warm climate items, content relating to running shoes, etc. In another embodiment, multiple aspects may be combined into a single query, for example, a query may seek content directed to men's basketball. It is further appreciated that one or more of these queries may be saved or stored locally at the user device 102 (or other device in communication therewith) thereby making repeating or re-running a query at a later time faster. One or more rules may be applied to query and/or user profile storage (discussed above) such that only those data aspects or queries which are permanent or semi-permanent in nature will be saved (e.g., gender) and those which are temporary or may become outdated are not saved (e.g., celebrities of interest). In another example, an event by the user may trigger certain queries or profile data to be saved, or not saved (e.g., the purchase of a pair of running shoes may trigger removal of data relating to the most recent purchase of running shoes being more than 6 months ago). Other searchable aspects may include, sports of interest, celebrities of interest, age, apparel and shoe sizes, age, etc.

At step 310 it is determined whether any content was identified in the content database 112 as a result of the queries. If content is identified, a URL identifying the content and its location is added to a list at step 322. If no content is identified meeting the queried criteria, general content is identified at step 312 and a URL relating thereto is added to the list (step 322). The general content may comprise non-specific content relating to e.g., upcoming holidays, men or women's apparel or sports generally, major events for the application developer (e.g., new releases, new application features, etc.), popular sports based on season, generally popular content, etc.

Per pathway B, at step 314 activity data is consulted. In one embodiment, this is accomplished by reviewing the user and/or device specific information against data in an activity database (such as that of the user activity/profile server 114). The user and/or device identifier is compared to those stored in the database to identify the particular user and/or device. Then, based on the stored activity data associated to that user or device, one or more activity aspects are determined (step 316). For example, it may be determined that the user logs at least three yoga workouts per week, that the user has consistently met a calorie goal for more than 3 months, and has recently logged his/her first running workout. In another example, it may be determined that although a user has purchased running shoes within the last six months, they have logged an excess of 500 miles in running workouts. In one variant, as discussed above, the determined activity aspects may be stored or saved locally at the user device 102 (or other device in communication therewith), thereby increasing speed at which pages may be generated natively as discussed herein.

The determined aspects are then used in a query to one or more content databases 112 at step 318. In one exemplary embodiment, the query may contain one or more content request, e.g., content directed to yoga, content in a size small, content relating to running shoes. Additionally, multiple aspects may be combined into a single query, for example a query of yoga apparel in size small. Similar to the processes discussed above, in one variant, one or more of the queries may be saved or stored locally at the user device 102 (or other device in communication therewith) to increase efficiency. Other searchable aspects may include e.g., recently logged workouts, classes which the user has signed up for or scheduled, and workouts that complement recently logged workouts.

Next, at step 320 it is determined whether any content was identified in the content database 112 as a result of the queries. If content is identified, a URL identifying the content and its location is added to a list at step 322. If no content is identified meeting the queried criteria, general content is identified at step 312 and a URL relating thereto is added to the list (step 322).

It is further appreciated that in another embodiment, queries may be made which incorporate determined profile aspects (step 306) as well as determined activity aspects (step 316). For example, a query may seek content targeted to a male, age 35, with an interest in running. Similar logic to that discussed above is applied to send the query and identify matching content.

Once both pathway A and pathway B have been completed the list of URL is provided to the user device 102 at step 324. Methods for building the page are then followed as discussed above with reference to FIG. 2. As discussed elsewhere herein, the type of content modules needed may correspond to a placement of each URL in the list such that the user device 102 need only follow the URL list in its provided order to fill in the content modules on a given page.

Figure 3B:
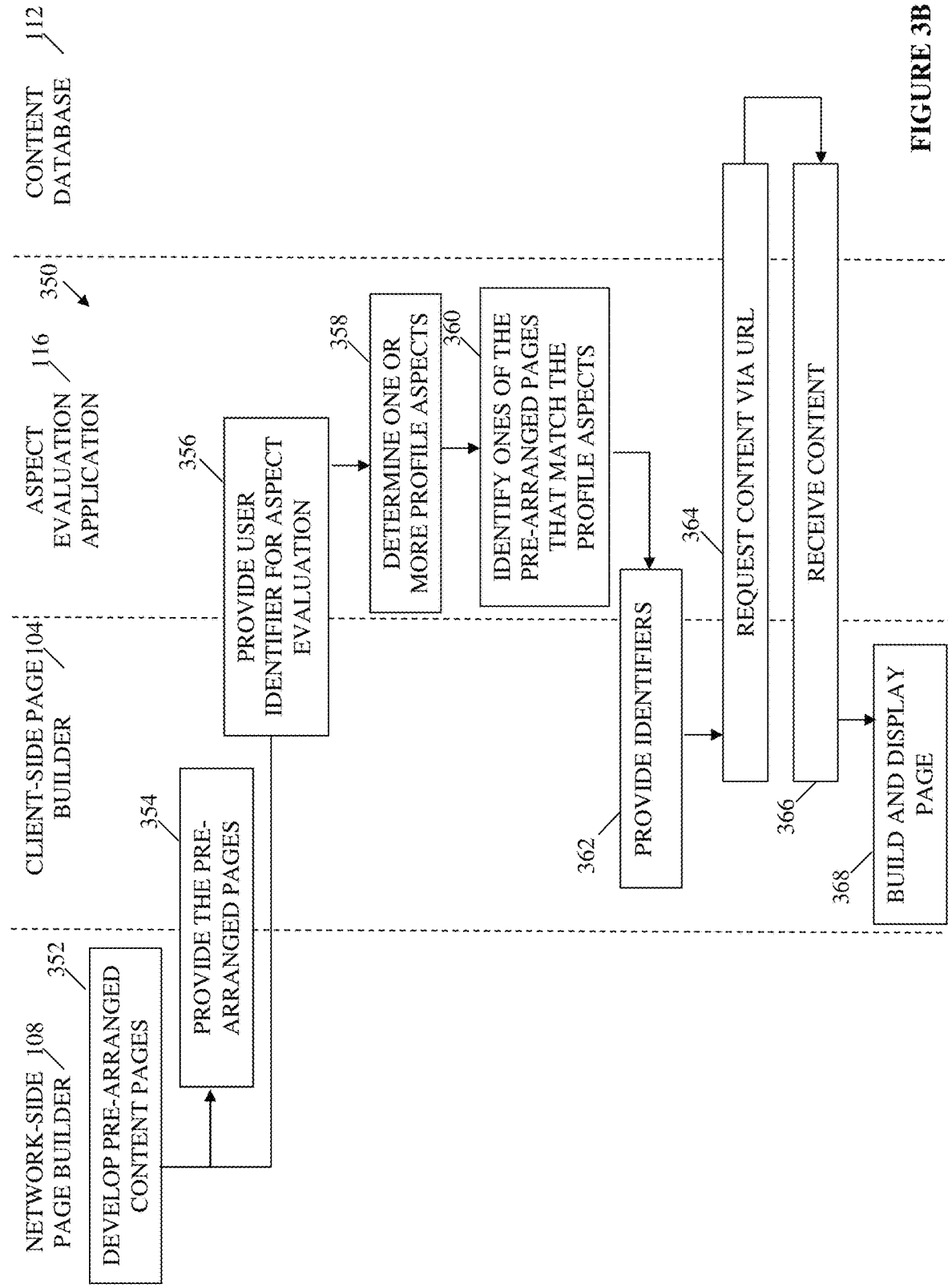
FIG. 3B is a flow diagram illustrating another exemplary method for identifying content in association with the assembly of native pages in accordance with one embodiment of the present disclosure.

Referring now to FIG. 3B, another exemplary method 350 for identifying content to be placed in a page is provided. As shown, one or more pre-arranged content pages are developed by a network operator at the network-side page builder application at step 352. User interfaces for developing page layouts are discussed below (see FIGS. 7A, 7B, 7C, 8A, and 8B). In the present aspect, the development of pre-arranged content pages comprises the aforementioned layout building, as well as a further step of identifying particular content which is always to be loaded into the page, thereby creating a static page having URL or other links to the content to be entered. In this manner, the page itself is generated natively at the loading device (e.g., user device 102) however the content to be loaded is predetermined for that page. In one example, a golf-related page may be developed. The golf page may include e.g., URL links to editorial content about Jordan Spieth, URL links to product details regarding golf shoes, etc. In another example, new product page may be developed. The new product page may include e.g., URL links to a video featuring the product, URL links to content modules for different styles, colors, etc. of the new product, etc. In a further embodiment, the specific content may be updated as a result of a search. For example, the pre-arranged page may be configured to contain a URL link to a search for products and/or other content relating to e.g., golf. According to this embodiment, the golf page would therefore have a link to a search which when run populates the page with available products having a "golf" tag or facet associated therewith.

All of the pre-arranged pages are provided from the network-side page builder application 108 to the client-side page builder application 104 at step 354. The pages are stored at the user device 102 in one embodiment. It is appreciated that according to this embodiment all of the pre-arranged pages are provided to the device, however only certain ones may be applicable to the user of the device. In order to determine which are to be displayed, a user identifier (or device identifier) is provided to an aspect evaluation application 116 at step 356.

At step 358, the aspect evaluation application 116 reviews the user and/or device specific information or identifier against data in an activity and/or profile database (such as that of the user activity/profile server 114) to determine one or more aspects. Specifically, the user and/or device identifier is compared to those stored in the database to identify the particular user and/or device. Then, based on the stored activity data associated to that user or device, one or more aspects are determined. For example, it may be determined that the user is a male, frequently logs running workouts, and has interest in the Maryland *Terrapin* football team.

The determined aspects are then matched against information relating to the pre-arranged pages at step 360. In one exemplary embodiment, the pre-arranged pages may comprise aspect identifiers (also referred to herein as facets or tags), such as e.g., "golf", "running", "men", etc. In another embodiment, comparison is made to aspects or tags of individual products within the content database 112. When a predetermined number of the page aspects match the user aspects, the page is identified as a match. The number required to identify a match may be predetermined by a network operator in one embodiment, or alternatively may be set by the system as a minimum requirement (e.g., at least 1 aspect must match). Identifiers unique to the pre-arranged pages which match the user's profile are provided to the client-side page builder 104 at step 362, to enable it to sort through all of the pre-arranged pages it received and only display those that are relevant to the user.

Once the client-side page builder application 104 identifies a page, the content to build the page is requested via the URL contained in the pre-arranged page layout (step 362). The request is made to the content database 112 and in response, the content database 112 returns the requested content (step 366). Once the content is obtained, the client-side page builder application 104 is able to build and display the page at step 368.

In another embodiment, only those pre-arranged which are determined to be relevant to the particular user are provided from the network-side to the client side (step 354). That is, the aspect evaluation application 116 receives the user identifier (step 356), determines profile aspects (step 358), and identifies one of the pre-arranged pages which match the user aspects (step 360). Those identifiers are provided to the network-side page builder 108 (rather than the client-side page builder 104 as occurs at step 362 discussed above). At this point, the network-side page builder 108 only provides those pages which are relevant to a user of the device 102 on which the client-side page builder application 104 is run. The client-side page builder 104 requests and receives the content listed in the pre-arranged pages for display thereat as discussed above.

Exemplary User Device

Figure 4:
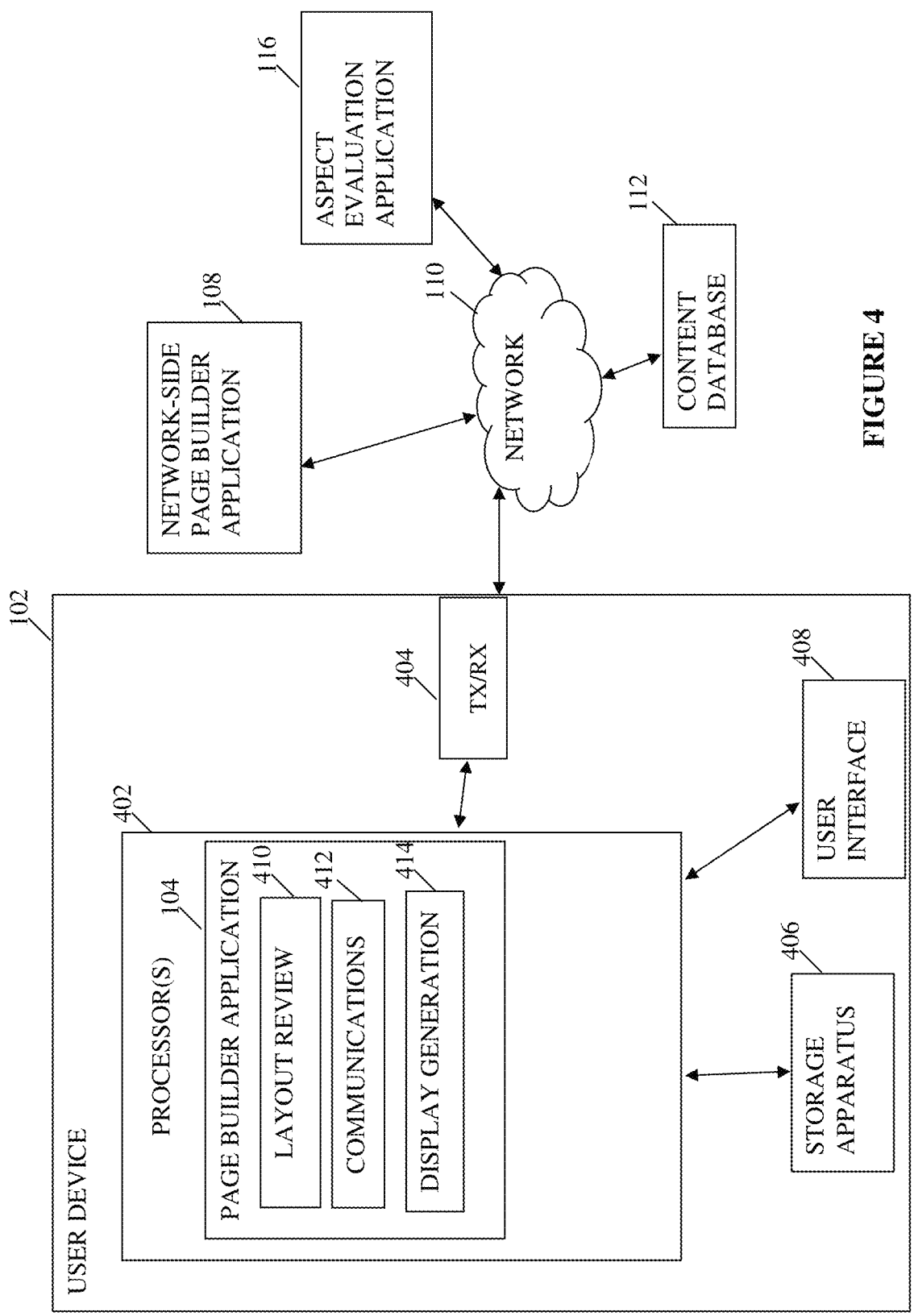
FIG. 4 is a block diagram illustrating an exemplary user device configuration in accordance with one embodiment of the present disclosure.

Referring now to FIG. 4, an exemplary user device 102 is provided. The user device 102 may comprise a portable computerized device in one particular embodiment. As illustrated, the device 102 comprises a processor 402, a transceiver 404, a storage device 406, and a user interface 408. As discussed in further detail below, the processor 402 is operable to run at least page builder application 104 thereon.

As noted above, the user device 102 may further comprise health-monitoring functionality. For example, the user device 102 may comprise a smart phone, smart watch, or other portable electronic device that is configured to both monitor user activity (such as via one or more sensors and/or inputs; not shown). Further, the user device 102 may be configured to access or run a computer application configured to provide data relating to the activity to the user e.g., a health monitoring application (not shown).

The transceiver 404 of the exemplary user device 102 illustrated in FIG. 4 enables receipt and transmission of communications to and from the user device 102. For example, the transceiver 404 facilitates the transmission of user activity updates and/or profile updates entered at or provided to the user device 102 to the appropriate database (e.g., storage at the user activity/profile server 114, etc.); the transceiver 404 is also configured to receive sensed/measured/obtained raw data from various sensors at the monitoring devices. In addition, the transceiver 404 facilitates transmission of content and content-related information between the device 102 and the content database 112. As shown, communication is also enabled between the user device 102 and the network-side page builder application 108 and the aspect evaluation application 116 as discussed herein.

The transceiver 404 may be any of various devices configured for communication with other electronic devices, including the ability to send communication signals and receive communication signals. The transceiver 404 may include different types of transceivers configured to communicate with different networks and systems. Such transceivers are well known and will be recognized by those of ordinary skill in the art. In some embodiments, the transceiver 404 includes at least one transceiver configured to allow the user device 102 to perform wireless communications with the cell towers of the wireless telephony network, as will be recognized by those of ordinary skill in the art. The wireless telephony network may comprise any of several known or future network types. For example, the wireless telephony network may comprise commonly used cellular phone networks using CDMA, GSM or FDMA communication schemes, as well as various other current or future wireless telecommunications arrangements. In some embodiments, the transceiver 404 includes at least one transceiver configured to allow the user device 102 to communicate with any of various local area networks using Wi-Fi, Bluetooth® or any of various other communications schemes.

The storage apparatus 406 of the exemplary user device 102 in FIG. 4 is configured to store local copies of e.g., collected raw activity data (received from the monitoring devices), a client-side version of the aforementioned computer applications (e.g., a health monitoring application and the page builder application 104), and any other locally created or stored data. In another embodiment, one or more user profile aspects and/or activity aspects and/or one or more queries are stored at the storage apparatus 406 (as discussed above). In a further embodiment, in some instances certain content (such as images, audio/video, editorial content, etc.) may be temporarily stored at the storage apparatus 406.

The processor 402 is configured to execute at least a page builder application 104 thereon. The page builder application 104 may be downloaded via a network interface from a web-based server, or alternatively be pre-installed on the device 102 at purchase. The page builder application 104 comprises a plurality of instructions which are configured to, when executed by the processor 402, enable native generation of application pages. In one specific embodiment, the page builder application 104 comprises a plurality of functional applications including: a layout review application 410, a communications application 412, and a display generation application 414.

The layout review application 410 comprises a plurality of instructions which are configured to, when executed by the processor 402, review the layout instructions of a requested page in order to determine content modules needed to build the page via a URL in the layout outline or provided in a list. In one embodiment, the layout review may simply examine an identifier of the page type (as is found in metadata relating to the page) in order to be informed of the specific modules needed. According to this embodiment, as will be discussed in greater detail below, a predetermined number of layouts are available each having a known module configuration. In one variant, the configuration repeats until no further content may be identified (such as content which meets a search criteria e.g., a search for "socks" or a search for "women's leggings"). Accordingly, the system is able to identify quickly a number and type of modules which are needed for a given page, simply based on the identifier thereof. In another embodiment, each page is associated with metadata identifying the individual modules required for its build. For example, the metadata may describe a single audio/video module, three editorial modules, followed by four item summary sales modules. The module may be accompanied by a URL list which provides links to the content in the order it is to be presented. Alternatively, the metadata may further include the URL links to the content. As discussed elsewhere herein, in certain embodiments, the particular content that is provided as URL links comprises content which is targeted to the particular user based on e.g., the user's profile and/or activity aspects. As noted above, the aspect evaluation application 116 receives a user identifier which it uses to match against stored profile and/or activity data (stored at the profile/activity server 114) to generate profile and/or activity aspects relating to the user. These aspects are compared to metadata describing a plurality of available content in order to identify one or more appropriate or targeted content; the URL or other identifier of the content are provided to the client-side page builder application 104.

The communications application 412 comprises a plurality of instructions which are configured to, when executed by the processor 402, enable intra-application and/or intra-device communications such as between the various applications of the page builder application 104 (e.g., the layout review application 410, and the display generation module 414). In addition, the plurality of instructions of the communications application 412, when executed by the processor 402, enable inter-application and/or inter-device communications such as between the foregoing applications and various other network apparatus, such as the server 106, the network-side page builder application 108, the aspect evaluation application 116, and the content database 112. The communications application 412 facilitates such communication via the transceiver 404, discussed above.

The display generation application 414 comprises a plurality of instructions which are configured to, when executed by the processor 402, enable the generation of a plurality of user interfaces discussed herein. Specifically, one or more user interfaces may be generated which enable the user to: select one or more pages for delivery, to access and interact with the requested pages, to purchase one or more items for sale, and so forth. In one embodiment, the display generation application 414 uses the URL list (discussed elsewhere herein) to request specific content from the content database (via the communications application 412 and transceiver 404). When the requested content is received, the display generation application 414 uses the content to build each page for display. In this manner, each page is built at the user device 102 natively rather than pulled as an entire page of content from a network database (as occurs in the prior art).

It is appreciated that the user device 102 may comprise additional applications (now shown) which contribute to the functioning thereof as described herein and/or the foregoing functionality may be distributed across more applications or combined into fewer applications. For example, the aforementioned health monitoring application may be provided via a separate application not discussed herein for ease of understanding. These and other components of the user device 102 will be clear to a person of ordinary skill in the art given the discussion of the functionality herein.

In one embodiment, the aforementioned processing is performed via coordination of a distributed application having client and network-side components. The network-side component may be run at a network entity and the client-side component run at the user device 102.

The herein-described applications which enable the native page building functionality discussed throughout the disclosure including e.g., the page builder application 104 the layout review application 410, the communications application 412, and the display generation application 414. A permanent copy of the programming instructions for these applications (104, 410, 412, and/or 414) may be placed into permanent storage devices (such as e.g., the storage apparatus 406) during manufacture of the user device 102, or in the field, through e.g., a distribution medium (not shown), such as a compact disc (CD), or from a distribution server (not shown) via the network 110. That is, one or more distribution media having an implementation of the agent program may be employed to distribute the agent and program various computing devices.

The herein described native page building applications (104, 410, 412, and/or 414) improve the functioning of the user device 102 by enabling it to natively build various pages. Furthermore, devices that are able to build native pages as disclosed herein can operate to more effectively target each page to a particular user efficiently.

Exemplary Sever

Figure 5:
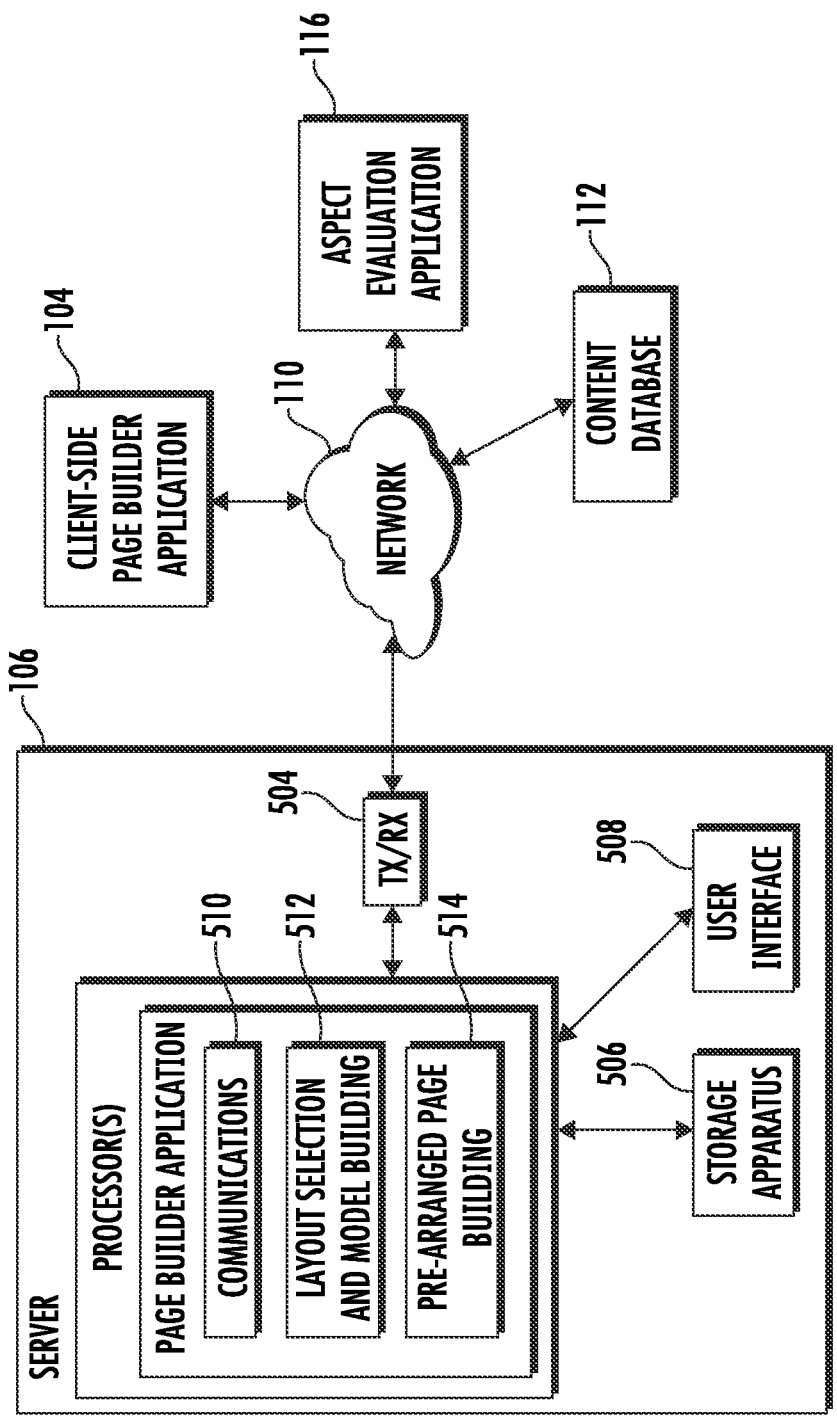
FIG. 5 is a block diagram illustrating an exemplary server device configuration in accordance with one embodiment of the present disclosure.

Referring now to FIG. 5, an exemplary server device 106 is provided. The server 106 may comprise a computerized device having a processor 502, a transceiver 504, a storage device 506, and a user interface 508. As discussed in further detail below, the processor 402 is operable to run at least page builder application 108 thereon.

The transceiver 504 of the exemplary server 106 illustrated in FIG. 5 enables receipt and transmission of communications to and from the server 106. For example, the transceiver 504 facilitates the transmission of user activity/profile data requests to the user profile/activity server 114, queries to the content database 112 and/or the aspect evaluation application 116, and content identification lists to the user device(s) 102. The transceiver 504 is also configured to receive requests from the client-side page builder application 104.

The storage apparatus 506 of the exemplary server 106 in FIG. 5 is configured to store local copies of e.g., sample queries to the content database 112, identified profile and/or activity aspects, exemplary layouts, a network-side version of the page builder application 108, and any other locally created or stored data.

The processor 502 is configured to execute at least a page builder application 108 thereon. The page builder application 108 comprises a plurality of instructions which are configured to, when executed by the processor 502, facilitate native generation of application pages at the user device 102 and enable a network operator or administrator to develop and apply a particular layout to each of a plurality of pages of an application to be run at the user device(s) 102. In one specific embodiment, the page builder application 108 comprises a plurality of functional applications including: a communications application 410, a layout selection and model building application 512, and a pre-arranged page building application 514. Each of these will be discussed in turn below.

The communications application 510 comprises a plurality of instructions which are configured to, when executed by the processor 502, enable intra-application and/or intra-server communications such as between the various applications of the page builder application 108 (e.g., the layout selection and model building application 512 and the pre-arranged page building application 514). In addition, the plurality of instructions of the communications application 510, when executed by the processor 502, enable inter-application and/or inter-device communications such as between the foregoing applications and various other network apparatus, such as the content database 112, the user profile/activity server 114 and the plurality of user devices 102. The communications application 510 facilitates such communication via the transceiver 404, discussed above.

The layout selection and model building application 512 comprises a plurality of instructions which are configured to, when executed by the processor 502, enable a network operator or administrator to select and/or build a layout for individual ones of a plurality of pages that form a particular application. For example, the application may comprise a mobile shopping application in one embodiment; according to this embodiment, the network administrator may comprise the builder or owner of the mobile shopping application. In one embodiment, a given set of layout types are provided, the application builder sets a particular one of the layout types for each page (as discussed below). In another embodiment, the application builder is given an opportunity to build a layout from among a set of predetermined content module types. According to this embodiment, the builder places the modules onto a page to build and then save the layout. It is appreciated that in either of the foregoing embodiments, the builder may select to have a portion or the entirety of the layout repeated a predetermined number of times and/or until there is no longer any available content. These and other layout building practices will be discussed in further detail below.

The pre-arranged page building application 514 comprises a plurality of instructions which are configured to, when executed by the processor 502, enable a network operator or administrator to build one or more pre-arranged pages. As discussed above, the pre-arranged pages comprise pages having pre-selected content that remains static (i.e., the content in the pre-arranged pages does not change based on the user). Rather, a number of cards are created and only those which are contain content targeted or of interest to the user (based on the aspect evaluation discussed herein) will be displayed to that user. In one embodiment, the pre-arranged page building application 514 enables the operator or page builder to create a layout of a page as well as to pre-populate the page with URL links to the content which will always be displayed at each module location. In this manner, the page itself is generated natively at the loading device (e.g., user device 102) however the content to be loaded is predetermined for that page.

The pre-arranged pages are, in one embodiment, all provided to the user device 102 and selection thereof for display of individual ones is performed at the user device 102 (based on information received from the aspect evaluation application 116). In another embodiment, only those pages which associate to the profile and/or activity aspects of the user are provided thereto (as determined by the aspect evaluation application 116). It is appreciated that, in one embodiment, the prearranged pages once completed may be stored at e.g., the storage apparatus 506 in addition to being sent to the user devices 102.

The pre-arranged page building application 514 may further enable the operator or page builder to manually enter or select from a provided list, one or more aspects relating to the page (e.g., "golf", "men's", "running", etc.). Alternatively, this identification may be made automatically based on metadata associated with the selected URL links. Further, the application 514 may enable the page builder to determine a number of aspect matches needed in order to have a pre-arranged page displayed at a particular user device 102.

It is appreciated that the server 106 may comprise additional applications (now shown) which contribute to the functioning thereof as described herein and/or the foregoing functionality may be distributed across more applications or combined into fewer applications. Including e.g., placement of the layout selection and model building application 512 at an individual administrator or operator device (not shown). These and other components of the server 106 will be clear to a person of ordinary skill in the art given the discussion of the functionality herein.

The herein-described applications which enable the native page building functionality and layout building discussed throughout the disclosure including e.g., the page builder application 108, the communications application 510, the layout selection and model building application 512, and the pre-arranged page building application 514. A permanent copy of the programming instructions for these applications (108, 510, 512, and/or 514) may be placed into permanent storage devices (such as e.g., the storage apparatus 506) during manufacture of the server 106, or in the field, through e.g., a distribution medium (not shown), such as a compact disc (CD), or from a distribution server (not shown) via the network 110. That is, one or more distribution media having an implementation of the agent program may be employed to distribute the agent and program various computing devices.

The herein-described applications (108, 510, 512, and/or 514) improve the functioning of the server 106 by enabling it to facilitate natively building pages at a user device 102 and enabling a network operator or administrator to build one or more page models or outlines to facilitate native page generation at the client-side page builder application 104.

Exemplary Profile/Activity Sever

Figure 6:
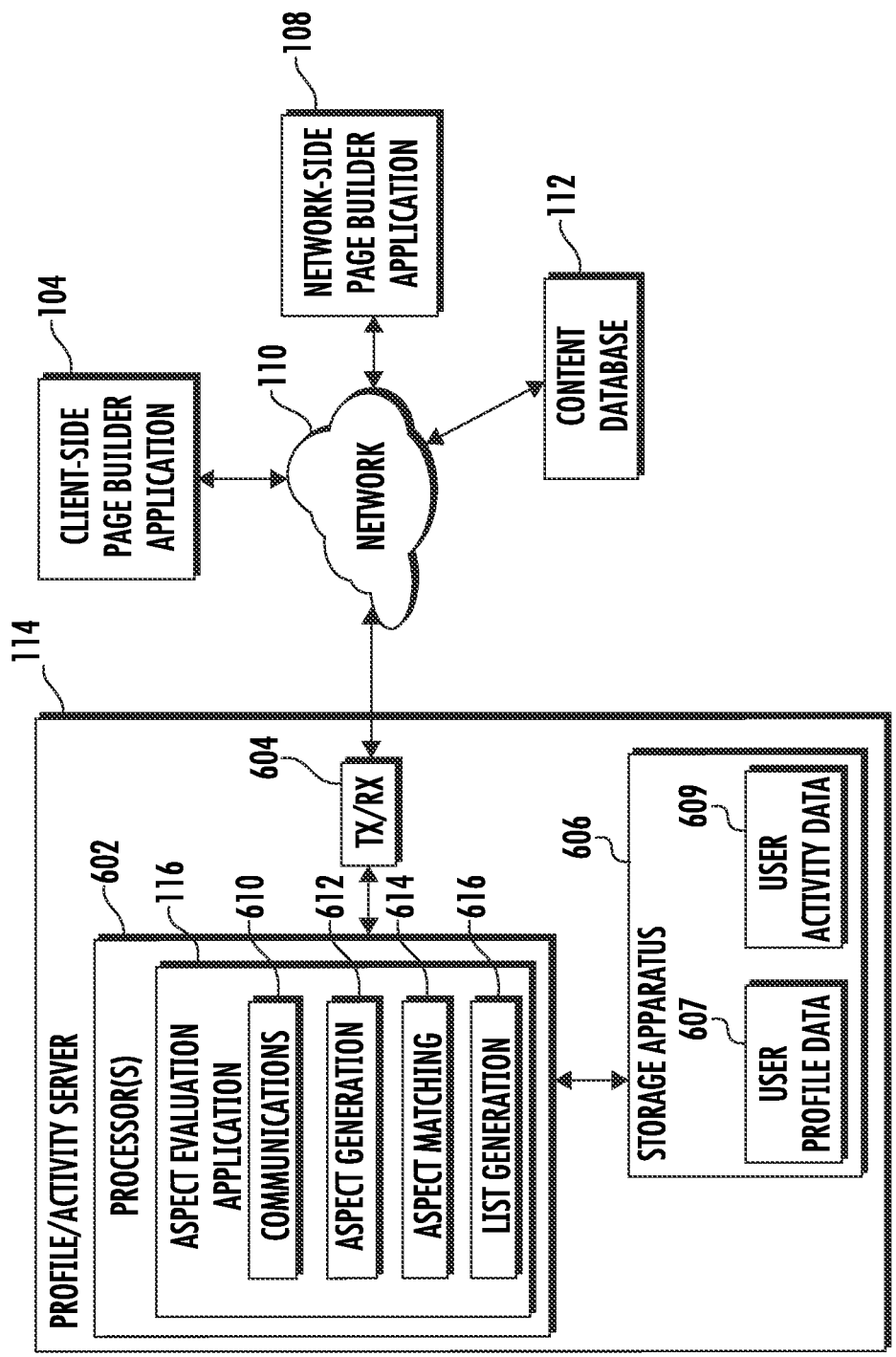
FIG. 6 is a block diagram illustrating an exemplary profile/activity server configuration in accordance with one embodiment of the present disclosure.

Referring now to FIG. 6, an exemplary profile/activity server device 114 is provided. The server 114 may comprise a computerized device having a processor 602, a transceiver 604, and a storage device 606. As discussed in further detail below, the processor 602 is operable to run at least an aspect evaluation application 116 thereon.

The transceiver 604 of the exemplary server 114 illustrated in FIG. 6 enables receipt and transmission of communications to and from the server 114. For example, the transceiver 604 facilitates the receipt of user identifiers and pre-arranged page information (to be used in an aspect query), the transmission of responses to user activity/profile data aspect queries and transmission of content identification lists and identified pre-arranged pages to the user device(s) 102. The transceiver 604 is also configured to receive requests from the client-side page builder application 104.

The storage apparatus 606 of the exemplary server 114 in FIG. 6 is configured to store pre-arranged pages and/or information relating thereto, profile data 607, activity data 609, an aspect evaluation application 116, and any other locally created or stored data. In another embodiment, the profile data 607 and/or activity data 609 may be stored at a separate entity or database in communication with the profile/activity server 114.

The processor 602 is configured to execute at least an aspect evaluation application 116 thereon. The aspect evaluation application 116 comprises a plurality of instructions which are configured to, when executed by the processor 602, facilitate the identification of content which is targeted to a particular user based on the user's profile and/or activity. In one specific embodiment, the aspect evaluation application 116 comprises a plurality of functional applications including: a communication application 610, an aspect generation application 612, an aspect matching application 614, and a content identification list generation application 616. Each of these will be discussed in turn below.

The communications application 610 comprises a plurality of instructions which are configured to, when executed by the processor 602, enable intra-application and/or intra-server communications such as between the various applications of the aspect evaluation application 116 (e.g., the aspect generation application 612, the aspect matching application 614, and the content identification list generation application 616). In addition, the plurality of instructions of the communications application 610, when executed by the processor 602, enable inter-application and/or inter-device communications such as between the foregoing applications and various other network apparatus, such as the content database 112, the network server 106 having the network-side page builder application 108, and the plurality of user devices 102 having client-side page builder applications 104. The communications application 510 facilitates such communication via the transceiver 404, discussed above.

The aspect generation application 612 comprises a plurality of instructions which are configured to, when executed by the processor 602, review user profile data and/or user activity data to determine one or more aspects therefrom. In order to do so, the aspect generation application 612 receives a user identifier (from the network-side page builder application 108 in one embodiment) which is used to identify various profile and/or activity records in the profile/activity database (e.g., storage 606). Once the appropriate records are identified, the aspect generation component 612 reviews these records for profile data of interest and for activity patterns, such as frequently logged activity, etc. The review of the records results in the generation of one or more aspects.

The aspect matching application 614 comprises a plurality of instructions which are configured to, when executed by the processor 602, identify content which matches one or more of the profile and/or activity aspects identified by the aspect generation component 612. In one embodiment, this is accomplished via utilization of a series of queries that are based on the determined aspects and run against a plurality of content data (such as data received from the content database 112 and/or the server 106 in the instance pre-arranged pages are used). The queries result in the identification of content and/or pre-arranged pages to be delivered to the user.

The content identification list generation application 616 comprises a plurality of instructions which are configured to, when executed by the processor 602, generate a list of the content identified by the matching application 614. In one embodiment, the content identifiers comprise URL for each item of content. The content identification list generation application 616 further compiles the URL for each item of content into a list arranged in order of appearance within the requested page and transmits the list (via the communications application 610 and transceiver 604) to the user device 102. As will be discussed in further detail elsewhere herein, the display generation application 414 at the user device 102 utilizes the list to build the requested page. In another embodiment, the pre-arranged pages that are determined to match the user aspects are identified via a page identifier, these identifiers are provided placed in a list by the list generation application 616 and transmitted as discussed above.

It is appreciated that the server 114 may comprise additional applications (now shown) which contribute to the functioning thereof as described herein and/or the foregoing functionality may be distributed across more applications or combined into fewer applications. These and other components of the server 114 will be clear to a person of ordinary skill in the art given the discussion of the functionality herein.

The herein-described applications which enable the aspect evaluation functions discussed throughout the disclosure including e.g., the aspect evaluation application 116, the communications application 610, the aspect generation application 612, the aspect matching application 614, and the content identification list generation application 616. A permanent copy of the programming instructions for these applications (116, 610, 612, 614, and/or 616) may be placed into permanent storage devices (such as e.g., the storage apparatus 606) during manufacture of the server 114, or in the field, through e.g., a distribution medium (not shown), such as a compact disc (CD), or from a distribution server (not shown) via the network 110. That is, one or more distribution media having an implementation of the agent program may be employed to distribute the agent and program various computing devices.

The herein-described applications (116, 610, 612, 614, and/or 616) improve the functioning of the server 114 by enabling it to evaluate a plurality of content against one or more determined aspects of a user profile and/or user activity.

Content Modules and Requirements

As noted elsewhere herein, the type of each content module is determined from a review of a page layout. In one embodiment, a predetermined set of content module types are provided. Exemplary content modules and requirements relating thereto are now discussed in greater detail.

It is noted that each content module comprises one or more content objects. A "content object" is an abstract representation of an arbitrary semantic reference. Each content object is interpreted differently depending on the module in which it is being used. Exemplary content modules will be discussed in greater detail below. In one specific embodiment, the structure of each content object is inferred by the parent object (which contains an array of content objects). An example of a general content object is as follows:

```
{
    "background_href" : "assets/hero/1.png",
    "title_image_href" : "assets/tech/speedform_header.png",
    "vertical_alignment": "bottom", // top, center,
    "horizontal_alignment" : "center", // left, right
    "title" : "Hello Speedform",
    "subtitle" : "Subtitle",
    "description" : "It all starts before you get on the field.
    We handpicked gear just for you"
    "text_color_id": 3,
    "font_size": 12,
    "font_weight": "normal"
}
```

In the example, the content object comprises a defined background, title image, title, subtitle, and description. Text details such as color, font size and weight are also defined. As shown in the example above, the horizontal alignment and vertical alignment properties are specified generically. According to this embodiment, the precise meaning of the alignment is determined by the specific module implementation. For example, the hero card module of the example given above uses the vertical alignment property to know which position to place the text vertically; whereas an editorial card (discussed elsewhere herein) may use this information to only modify the position of a call to action or CTA.

As used herein, a "content module" is specified by a module spec (module) and the content associated with that module (content). An exemplary content module is provided below:

```
{
    "type": "module_layout_type",
    "subtype" : "module_layout_subtype",
    "content": {
        <content>
    }
}
```

As shown, the module may comprise a type, a subtype, and the relevant content. In one embodiment, the module types include: category header modules, editorial modules, hero modules, module collections, navigation modules, product modules, and subscribe modules.

Category header modules are used to divide a product grid into sections. Category headers take up an entire width of a mobile device screen, in one embodiment. In another specific variant, the category header modules resemble the default section header of an iOS UI TableView. An exemplary category header module is provided below:

```
{
    "type": "category_header",
    "content": {
        "title": "Running Shoes"
    }
}
```

As shown, the category header module is a "category header" type. No subtype is given in this embodiment. In the provided example, the content provided in the category header module comprises a title "Running Shoes". Hence, it is intended to introduce any following content modules which will relate to the general category of Running Shoes.

There are various types of editorial modules including e.g., a product editorial, a quote editorial, a copy editorial, and a video editorial. The product editorial module may be associated with one or more CTA including a shopping CTA and a CTA to obtain further information. In one embodiment, a series of pages may be assembled such that a user may scroll between multiple product editorials using e.g., a swiping motion left or right. In another embodiment, the product editorials are not associated with any background images or colors because such backgrounds would impair the user's ability to understand e.g., a CTA. It is further noted that in the instance that a title image and a title are present, the title image will take priority. Generally, the product editorials will include a type, subtype and editorial content as shown in the example below:

```
{
    "type": "editorial",
    "subtype": "product",
    "content": {
        "background_href": "img/to/background2.png",
        "title": "Speedform",
        "title_image_href" : "img/assets/speedform.png",
        "subtitle": "Locked-in, loaded out",
        "description": "Lorem ipsum dolor simet",
```

```
        "vertical_alignment" : "bottom",
        "horizontal_alignment" : "center",
        "text_color_id": 3
        "_links": {
            "cta" : [
                {
                    "title": "Learn more",
                    "facets": [
                        "shoes",
                        "speedform"
                    ]
                }
            ]
        }
    }
}
```

An exemplary quote editorial module is provided below, as shown, the module is given the type: editorial and the subtype: quote. In the provided example, a title and subtitle are given which relate to the quote, which in this example is made by Jordan Spieth. The quote itself is contained within the "description". Additionally, details relating to the text itself are given.

```
{
    "type": "editorial",
    "subtype": "quote",
    "content": {
        "background_href": "img/background/jordan_spieth.png",
        "title": "Jordan Spieth",
        "subtitle": "on winning the Masters",
        "description": "To join Masters history and put my name on that trophy and to have this jacket forever, it's something that I can't fathom right now",
        "horizontal_alignment": "center",
        "text_color_id": 3
    }
}
```

An copy editorial module is provided below. In the given embodiment, the module comprises simply a title and subtitle centered vertically in the module. It is appreciated that in one variant, a network operator or administrator may edit the horizontal alignment and/or text color when placing a copy editorial module in a page layout (as discussed below). In another embodiment, a title image may replace the text title of the illustrated embodiment.

```
{
    "type": "editorial",
    "subtype": "copy",
    "content": {
        "title": "CURRY ONE AWAY",
        "title_image_href": "/path/to/title_image.png",
        "description": "Lorem ipsum dolor sit amet, consectetur adipiscing elit. Aliquam nec lectus et tortor malesuada elementum non vitae libero.",
        "horizontal_alignment": "center",
        "text_color_id": 3
    }
}
```

A video editorial module, in one embodiment, has a fixed layout such that the operator/administrator may not alter the module when placing it within the layout of a page (discussed below). An exemplary module for a video editorial is provided here:

```
{
    "type": "editorial",
    "subtype": "video",
    "content": {
        "background_href": "img/background/patrick_peterson.png",
        "title": "Patrick Peterson",
        "description": "See how this NFL star uses Speedform tech in his own workout.",
        "media_href" : "link/to/media.mov",
        "text_color_id": 3
    }
}
```

The hero module (also referred to as a "hero card") comprises a "cover" of sorts. The hero card/module uses primarily images (and minimal text) to convey both the emotion and the content of the category of purchasable items it represents. A sample hero module is provided below:

```
{
    "type": "hero",
    "content": {
        "title": "HELLO SPEEDFORM",
        "background_href": "assets/hero/1.png",
        "title_image_href": "assets/tech/speedform_header.png"
        "vertical_alignment": "bottom", // top, center,
        "horizontal_alignment" : "center", // left, right
        "description" : "It all starts before you get on the field. We handpicked gear just for you",
        "text_color_id": 3
    }
}
```

As shown, the content includes a title and minimal text. In another embodiment, the height of the background image is set as full screen. In other words, the background image changes not only in resolution, but also in aspect ratio depending on the device on which it is being displayed. In order to accomplish this, in one variant, raw sizes are provided (rather than device configurations). In this manner, the content authors (e.g., network operator or administrator) is able to control and specify the background behavior and asset for a given device. In another variant, the client may pass a size to the server, and the server responds with an image at that matches the appropriate size.

A module collection is used to create a grouping of modules. In one exemplary embodiment, a module collection is for populating multiple product modules with product data returned from a single product search. In another exemplary embodiment, a module collection may be used to create repeating module patterns. That is to say, when the repeat option is set to 'true', the collection will repeat, such as until all products in the product collection have been exhausted. In one variant, a module collection enables a particular pattern to be repeated and at a certain iteration of the pattern, specific content is inserted. For example all content having a "golf" tag pr facet associated therewith may be displayed in a 2-up, 2-up, feature pattern, and after the first, third, and fifth iteration of the pattern (or whichever iterations are selected by the operator), content specified by the operator is inserted; the pattern may be set to continue until no products remain. Additionally, the content selected to be inserted may comprise editorial content in one embodiment. An exemplary module collection module is provided herein:

```
{
    "type": "module_collection",
    "modules": {
        "objects": [
            <2_up>,
            <2_up>,
            <featured_product>
        ],
        "total_count": 3,
        "content": {
            "products": <product_collection>
        },
        "options": {
            "repeat": true
        }
    }
}
```

In the above example, the collection module further comprises various product modules (e.g., 2_UP, featured product, etc.) which will be discussed in greater detail below. As shown, the pattern of 2-up, 2-up, featured product continues with content being pulled from a particular content collection (in this example denoted "product_collection"). The aforementioned iteration rules may be identified by inserting into the above example an iteration index. The iteration index indicates, in one example, a number of iterations of a set pattern which should be performed before a selected content (such as editorial content) is inserted.

The navigation modules are designed to anchor a module or page with navigation links that are relevant to the context or story on a given module or page. An exemplary navigation module is provided:

```
{
    "type": "navigation",
    "content": {
        "title": "Shop Training"
    },
    "_links": {
        "navigation": [
            {
                "title": "Womens",
                "facets": [
                    "women"
                ]
            },
            {
                "title": "Mens",
                "facets": [
                    "men"
                ]
            }
        ]
    }
}
```

As shown, the module includes navigation links to "women's" and "men's" in this example. Various rules may be applied to the navigation module such as limits to the number of links per page, types of links available from each page, etc.

The product modules include featured product modules, 2-up product modules, and product category modules. Product modules are intended to provide information relating to purchasable items.

The featured product module serves as a showcase for select products within the card category. Multiple feature modules can be inserted into a page in one embodiment. Rules may further be provided which require that each feature product module be separated by other content modules, i.e., they cannot follow immediately after one another on a page. The featured product module allows the user to view different images of a single product. In another variant, the user may also change attributes of the item and purchase the item from within the grid structure. In another alternatively, the user taps or clicks on the product image in order to be taken a detailed view. Another rule may be implemented to ensure that the featured product module only displays one product. In one such instance, if the product_collection contains more than one product or is the result of a search, only the first product will be displayed. An exemplary featured product module is provided below:

```
{
    "type": "product",
    "subtype": "featured",
    "content": {
        "products": <product_collection>,
        "description": "Tell a story about the product",
        "text_color_id": 3
    }
    "options": {
        "allow_likes": true,
        "display_color_options": false
    }
}
```

The 2-up product module serves as a side by side display of 2 products within the same product category. Multiple grid modules can, in one embodiment, be inserted into a given page or category screen structure. As shown at e.g., FIG. 7B discussed below, the grid product module allows the user to view different images of two products at the same time. In another embodiment, the user may change attributes of individual ones of the two products and/or purchase one or both products from within the grid structure itself. In another alternative, the user taps or clicks on the product imagery in order to be linked to a detail view. Rules which may be applicable to the 2-up product module include a static height therefor (to ensure the two product images, etc. align to one another). An exemplary 2-up product module is provided:

```
{
    "type": "product",
    "subtype": "2_up",
    "content": {
        "products": <product_collection>,
        "text_color_id": 3,
    }
    "options": {
        "allow_likes": true,
        "display_color_options": false
    }
}
```

The 2-up product module of the above example is set to display items from a product collection by two's. That is if the product collection includes four items, the first two are placed into a first 2-up module, and the second two are placed in a second 2-up module. This pattern may continue until the entire category is exhausted and all products have been displayed. In one particular embodiment, when an odd number of products appear, the space where a second product would be featured is simply left blank. Alternatively, other backgrounds or module types may be inserted into the empty space.

The product category module in one embodiment displays images, audio/video, text, etc. relating to one product as well as a detail cell having at least a category title and CTA. In one embodiment, the product category module is generally used in the context of a category screen. An exemplary product category is provided below:

```
{
    "type": "product",
    "subtype": "category",
    "content": {
        "title" : "SHIRTS & TOPS",
        "subtitle" : "Softer. Sleeker. Betterer.",
        "products": <product_collection>,
        "_links" : {
            "cta" : {
                "title" : "VIEW ALL >",
                "facets" : [
                    "women",
                    "tops"
                ]
            }
        }
    },
    "options": {
        "allow_likes": true,
        "display_color_options": false
    }
}
```

As demonstrated in the above module, in this particular example, all shirts and tops in the product cateogry marked "Softer. Sleeker. Betterer." are to be provided in the module. In addition, a CTA to view all may be provided. A product collection is referenced within the example above.

The product collection may result from a product search, or may comprise a list of product SKU's, style identifiers, and/or UPC's. In the instance the product collection is generated via a product search, the software application will fetch the first page of products using the search reference or identifier and use the returned products to populate the module. The order of products in the response is maintained, in one embodiment, when displaying the products. An exemplary module of this type is provided:

```
{
    "type": "search",
    "product_href": [
        "https://<hostname>/api/v1.0/product/US/search?q=hoodies"
    ]
}
```

In the given example, all products which result from a search of the term "hoodies" are provided. In the instance the product collection is generated via a style identifier, the software application will concurrently fetch all of the items in the list and display the items in that order in one embodiment. An exemplary product collection resulting from a style identifier list is shown below:

```
{
    "type": "list",
    "product_href": [
        "https://<hostname>/api/v1.0/product/US/sku/<some_SKU>",
        "https://<hostname>/api/v1.0/product/US/upc/<some_UPC>",
        ...
    ]
}
```

The subscribe module enables a user to request to receive information regarding a product or category of products (displayed in the module as an image, audio/video, and/or text) in the future from the item manufacturer. In one embodiment, the subscribe module contains a full screen background image with a singular input field and contextual CTA. The module is designed only to elicit a single request, and thus does not stray from this focused objective. An exemplary subscribe module is provided:

```
{
    "type": "subscribe",
    "content": {
        "background_href": "something",
        "title": "Be the first to know when each colorway drops"
    }
}
```

As shown, the content of the module includes instruction or an explanation of the subscription. In the given example, the user would indicate whether he/she would like to "be the first to know when each colorway drops"; however, other subscriptions and instructions may be provided.

A story module may also be provided in one embodiment. The story or explore module contains a module object which represents the list of modules and their properties to be displayed in the module or on the page. In one variant, the story module may be comprise the pre-arranged pages discussed elsewhere herein. Similar to the other pages or modules discussed herein, the story module also contains tags or facets which will be used to identify the content of the page (in order to match to or target specific users). An exemplary story is provided below:

```
{
    "modules" : {
        "objects": [
            <module_1>,
            <module_2>,
            ...,
            <module_n>
        ],
        "total_count": n,
        "options": {
            "repeat": true
        }
    },
    "options": {
        "always_show": true
    },
    "tag_ids": [
        1,
        3,
        5,
        7,
        9,
        77
    ],
    "_links": {
        "self": {
            "href": "/explore/45767d4cff3c761c5b29",
            "id": "45767d4cff3c761c5b29"
        }
    }
}
```

As noted above, a tag object (also referred to herein as a "facet") represents an attribute that can be applied to a story or explore module and/or to content generally. An exemplary tag is shown below:

```
{
    "title": "Men",
    "id": 1,
    "image_href": "http://ua.com/men_image.png"
}
```

The exemplary tag above is used to identify content which relates to "men". Then, as noted above, when the content database is queried to determine content which matches one or more user profile aspects, these tags or facets are reviewed.

Exemplary Page Layouts

Figure 7A:
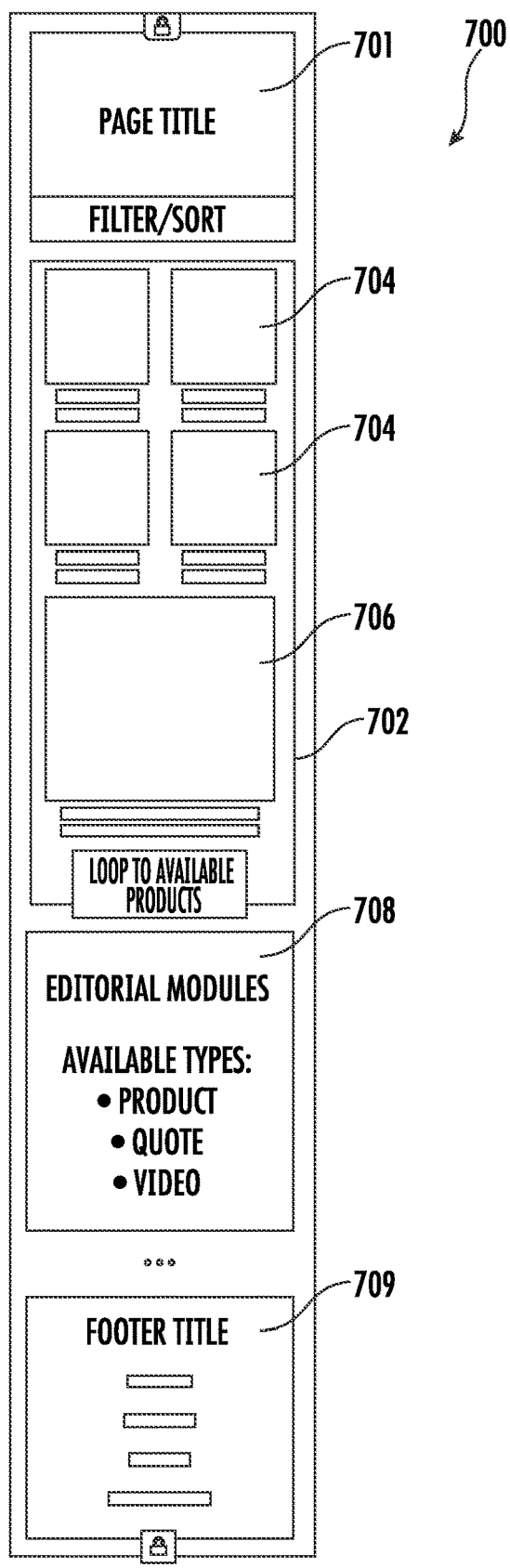
FIGS. 7A-C are diagrams illustrating exemplary user interfaces to deliver the natively generated content in accordance with one embodiment of the present disclosure.
Figure 7B:
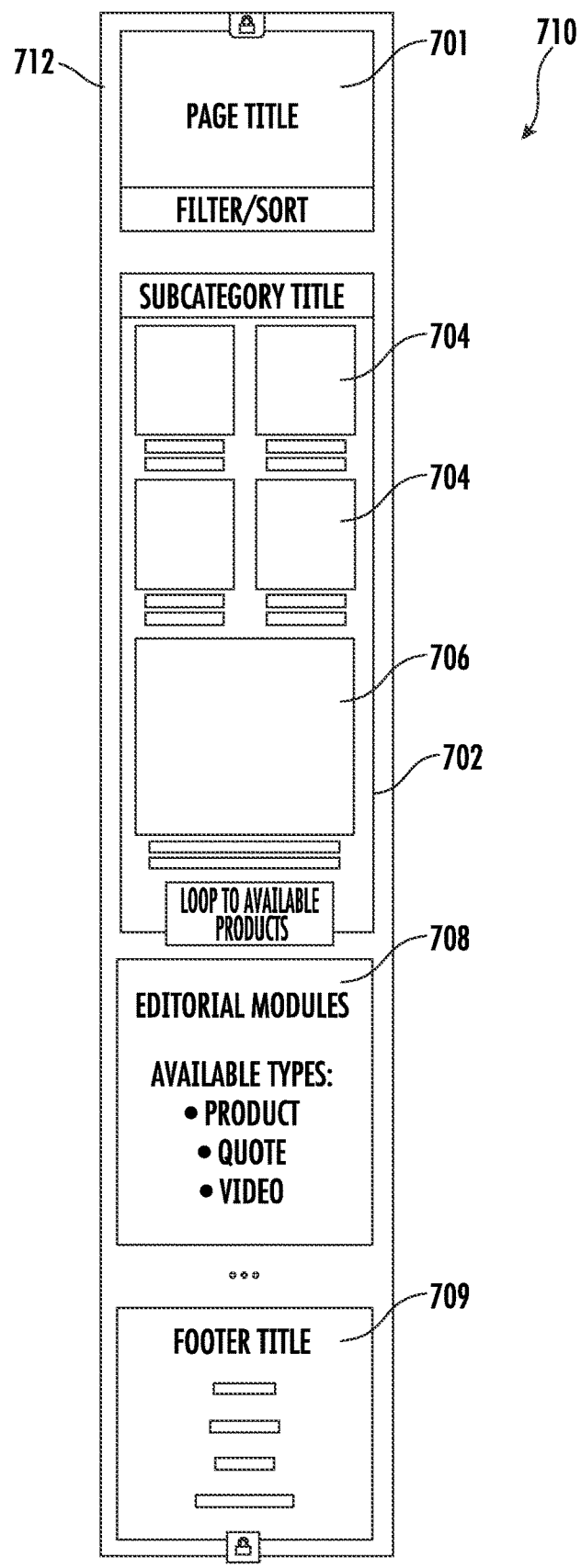
Figure 7C:
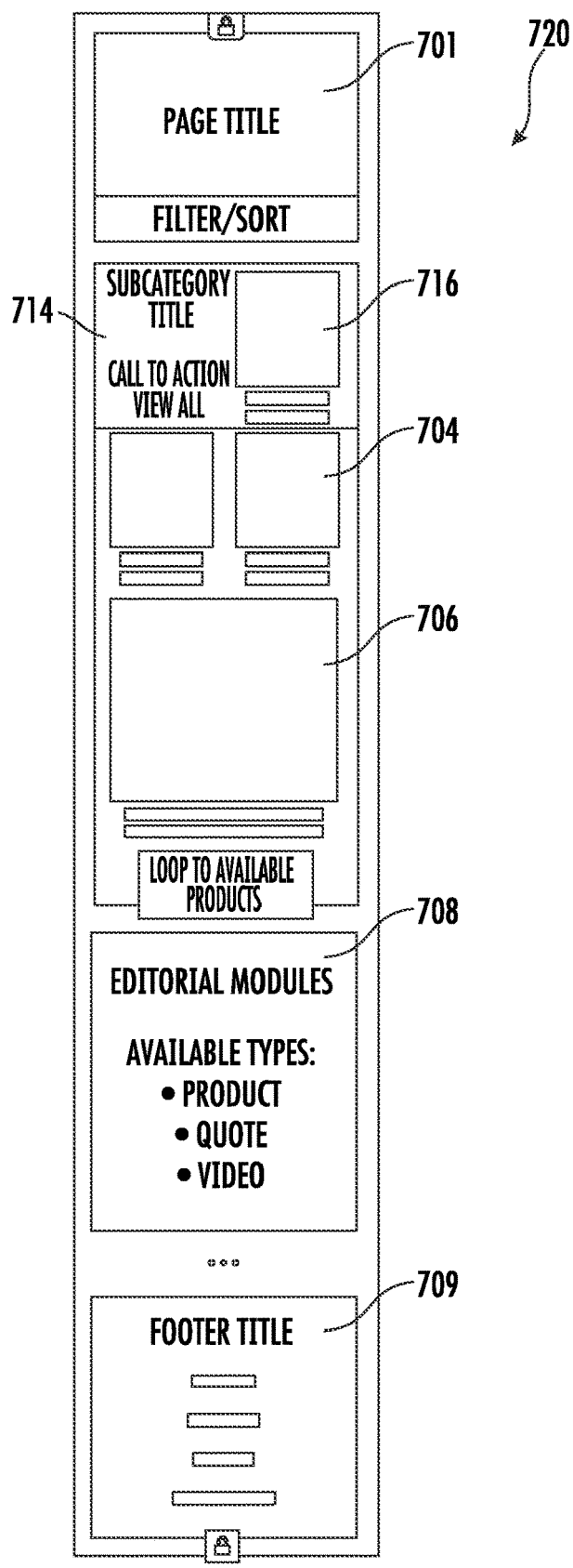

Referring now to FIGS. 7A-7C, exemplary page layout templates are shown. In one embodiment, the layout templates are provided to an operator/administrator when creating a new page. The operator/administrator may select from among the given templates, and make one or more adjustments or changes. Alternatively, the operator/administrator may create a new page without the use of a template.

FIG. 7A illustrates an exemplary simple grid arrangement 700. In one embodiment, the simple grid arrangement 700 is set as the default grid template type when an operator begins building a page. However, bottom level categories are best utilized in this grid type because all of the products that are returned (such as from a search) are displayed. This is represented in FIG. 7A by the dotted lines which indicate that the portion denoted 702 is repeated for available products. The repeated or looped portion 702 comprises, in this example, two 2-up product modules 704 followed by a single featured product module 706, however other orientations and modules may be utilized with equal success. The simple grid arrangement 700 further includes a page title module 701 which introduces the products to be displayed.

The simple grid arrangement 700 allows for multiple editorial modules 708 to be displayed after set cycles 702 of the grid sequence (i.e., so-called "iterations" as discussed above with respect to the collection modules). Once all of the products have been displayed, a footer 709 is provided. The footer may include a call to action (CTA), links to other products or searches, and/or any other general information.

FIG. 7B illustrates an exemplary expanded group grid 710. As shown, the expanded group grid 710 comprises a page title module 701 similar to that of the simple grid arrangement 700. The expanded group grid 710 in one embodiment, is the recommended grid template when displaying multiple categories. As shown, each product category or subcategory is given a title module 712. Thereafter, all products within the sub-category are displayed. In one embodiment, the products are displayed in a manner similar to the repeated portion 702 of the simple grid arrangement 700. That is to say, following the subcategory title, one or more 2-up product modules 704 followed by a single featured product module 706 may be presented until no products remain to be displayed. In another embodiment, after all of the products of a particular category are provide, the expanded group grid template 710 enables an editorial modules (such as the editorial module 708 illustrated in FIG. 7A) to be used to separate different categories. In other words, following the editorial module (such as editorial module 708) a new set of products such as the repeated portion 702 of FIG. 7A is provided. This pattern may continue until no further products are available, at which point the footer 709 is displayed. Such layout is generally used to display e.g., the results of a search.

FIG. 7C illustrates an exemplary truncated grouped grid 720. This template is recommended for top level grid screens in one embodiment. As shown, the layout 720 comprises a title module 701 followed by a subcategory title module 714. The subcategory title module 714 introduces the subcategory and in one variant includes a CTA to e.g., "view all". The subcategory title module 714 includes at least one product image 716 or other descriptive content. Thereafter, a 2-up product module followed by at least one featured product module 706 are displayed. In one variant, this pattern continues only for the first six products (i.e., one 2-up, one feature, one 2-up, one feature to arrive at a total of six products being displayed). Each new subcategory is introduced by a subcategory title module 714. When all of the subcategories have been introduced, an editorial module 708 may be provided, followed by the footer 709.

Exemplary Building Interfaces

Figure 8A:
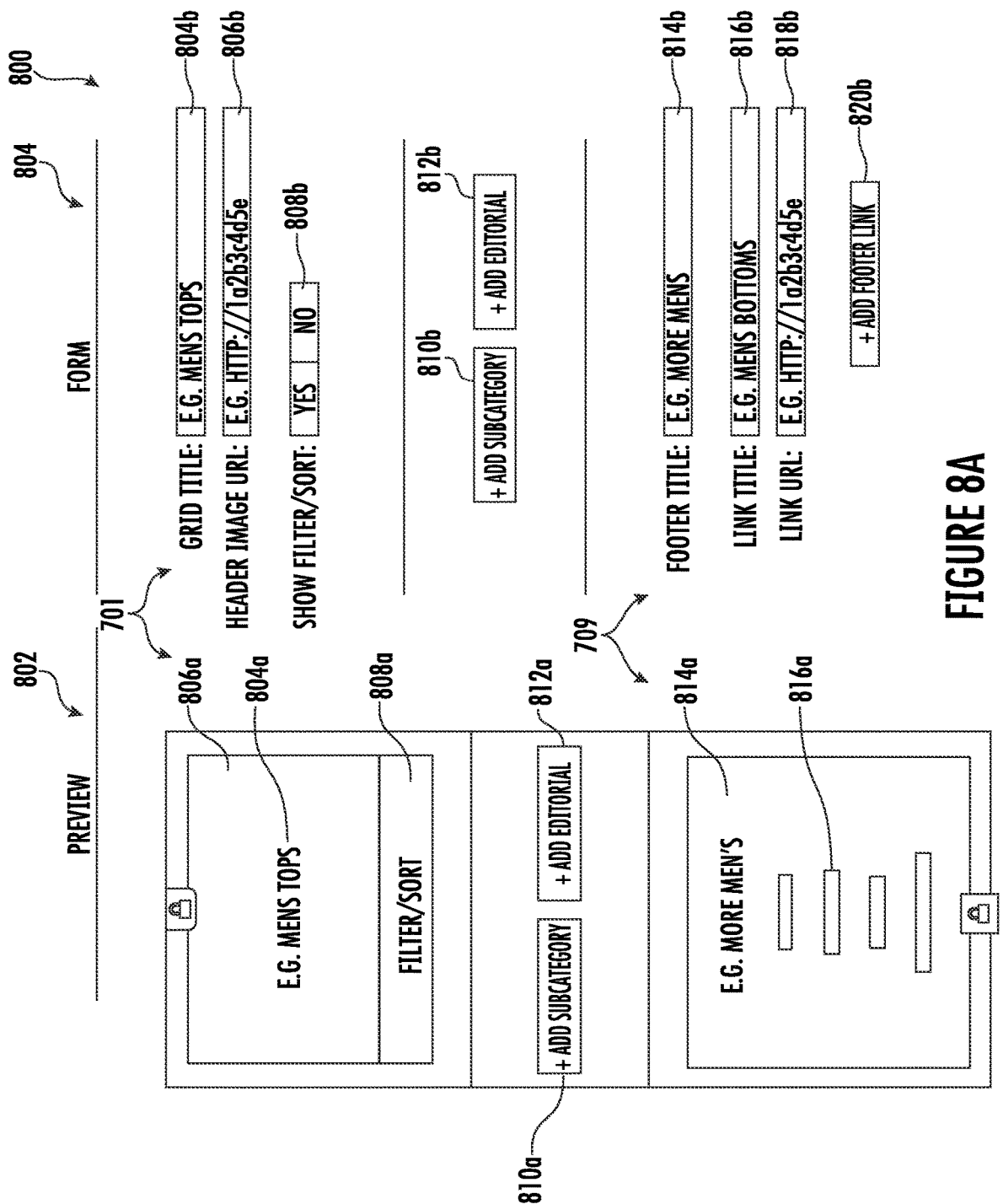
FIGS. 8A-B are diagrams illustrating exemplary user interfaces for the creation of one or more templates for native content generation in accordance with one embodiment of the present disclosure.
Figure 8B:
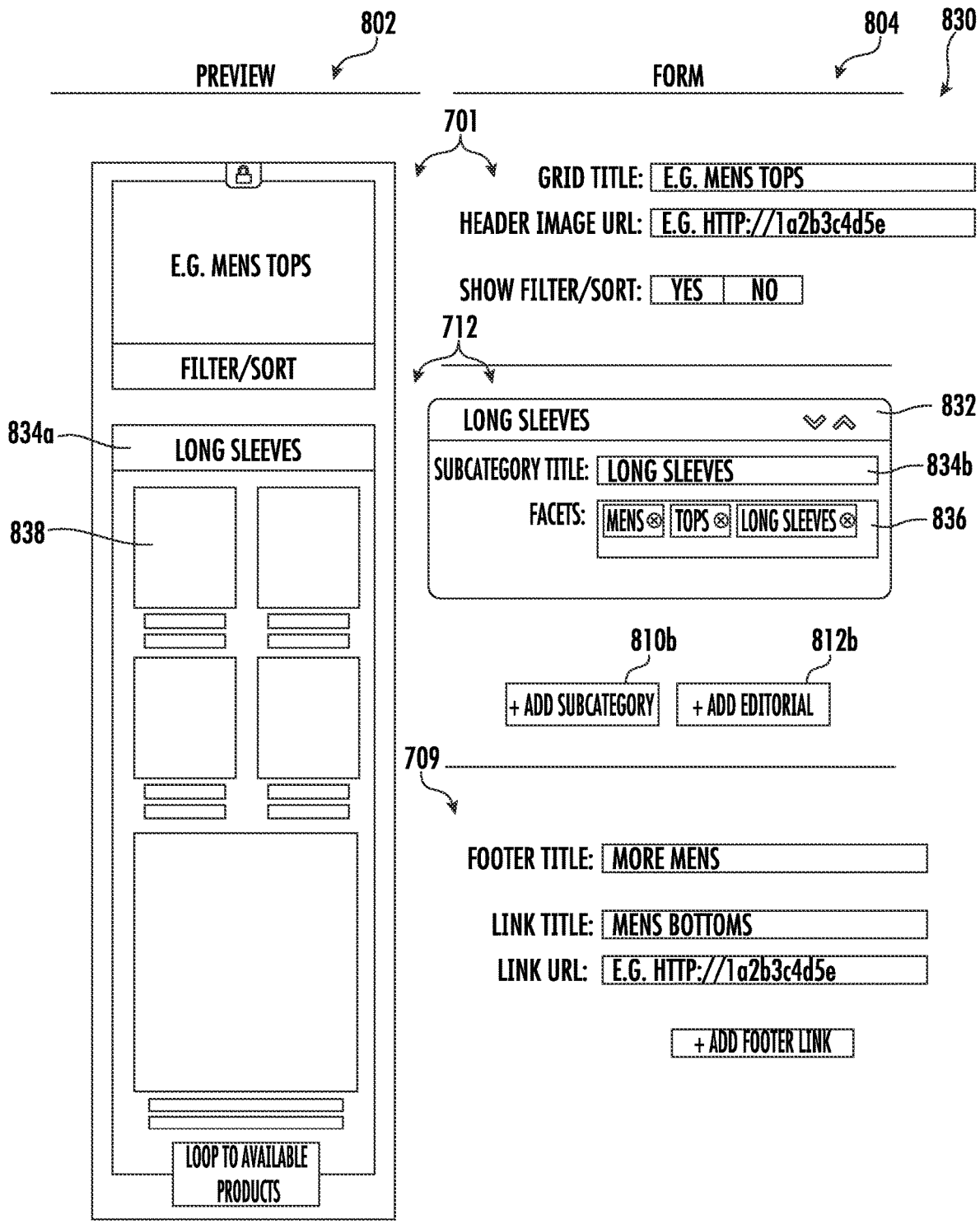

As noted above, in one embodiment, a network operator/administrator is provided with an interface for building application page layouts either from templates or without the use of a template. Exemplary interfaces utilized for application building are provided in FIGS. 8A-8B. In the examples of FIGS. 8A-8B, an expanded group grid 710 template is utilized; however, it is appreciated that similar interfaces may be used for the other template types (discussed above) and for the instance where no template is utilized.

As shown in FIG. 8A, a network operator/administrator when building an application page (also referred to herein as an application builder) selects a template and is directed to a page building interface 800. The interface 800 comprises a previous section 802 and a form section 804. The preview section displays the page as it is built so that the page builder can get a visual indication of placement, etc. In one variant, the preview section 802 may be populated with actual content pulled from e.g., the content database 112 in much the same way the devices 102 would pull the content for generating the pages thereat. In another variant, the preview section 802 merely provides a skeleton or outline of what the page will look like, without displaying any precise content. Any variation or combination of the foregoing may also be provided.

The form section 804 comprises a series of boxes, buttons, drop down menus, etc. which correspond directly to specific spaces in the selected template. As discussed, the application page builder adjusts titles, links, images, etc. to build portions of the page which are not generated at the user device 102 but rather inform the build at the user device 102. As shown, the template includes a title module 701 having a text title 804a and image 806a. In order to edit the title text and image, the operator enters the title to be displayed at the box 804b and enters a URL for the desired image at 806b. In one embodiment, the title and image entered in the form 804 are uploaded to the preview section 802. In another embodiment, only the title may be uploaded for display in the preview; the image is instead only displayed to the user at the time the user device 102 loads the page. That is to say, the user device 102 determines that the image is required, and calls to the content database 112 for the image based on the provided URL (such as in the ordered list of URL provided thereto). The title module 701 further includes a filter/sort button 808a which enables a user to filter or sort the items in the category defined by the title 804a. The page builder elects whether to enable the feature at the toggle switch 808b.

In FIG. 8A, the operator is able to add additional subcategories and editorial content via the buttons therefore 810b and 812b, respectively. The preview section 802 simply displays icons 810a and 812a that indicate that subcategories and/or editorial content may be added. FIG. 8B demonstrates the addition of subcategories and/or editorial content and will be discussed in greater detail below.

The footer module 709 comprises a text title 814*a* and a plurality of links each having a title 816*a* that is displayed to the user and an associated URL to enable the user device 102 to call the content when the title is clicked by the user. Similar to the interaction discussed above, the page builder enters the footer title at the box marked 814*b*, the link title at 816*b* and the link URL at 818*b*. The page builder is able to add additional footer links using the "add footer link" button 820*b* in the form 804.

Referring now to FIG. 8B, the preview 802 and form 804 are updated to demonstrate the addition of the subcategory "long sleeves". As shown, a title module 712 is provided; the text to be included in the title is added by the page builder at box 834*b* and is displayed at 834*a* in the module 712. As shown, the user in this example has selected the "long sleeve" subcategory from a drop down list 832 of possible subcategories. In one variant, the facets 836 of the subcategory are prepopulated based on the category selected. The operator may remove and/or add additional facets as he/she deems necessary. The facets are used, as discussed above, to assist in targeting content to a particular user. Content returned from a search of the subcategory (including the facets thereof) is provided in the display according to the template. In the given example, after presentation of the title 834*a*, all of the products within the sub-category are displayed. In one embodiment, the products are displayed in a repeating pattern of two 2-up product modules and one featured product module. However, other display arrangements may be used with equal success.

The administrator/operator may add additional subcategories and/or editorial content as desired per buttons 810*b* and 812*b*, respectively. Finally, a footer is displayed.

In summary, a method of enabling native page generation at a user device is given. In one embodiment, the method comprises: (i) receiving a request to open a first page from a user via at least a user interface of the user device; (ii) receiving, in response to a request therefor, a plurality of layout instructions relating to the requested first page, the instructions comprising at least a list of content identifiers; (iii) calling individual ones of the content identifiers in the list to retrieve content modules associated thereto; and (iv) building the first page using the individual ones of the content modules received from a content database in response to the act of calling.

In addition, a non-transitory, computer readable medium is provided. In one embodiment, the non-transitory computer readable medium comprises a plurality of instructions which are configured to, when executed, cause a user device to: (i) receive a plurality of pages, each of the plurality of pages comprising: a unique identifier associated thereto; layout instructions configured to identify at least particular ones of content to be inserted therein; and metadata identifying one or more aspects associated to the particular ones of content; (ii) receive a list of individual ones of the unique identifiers corresponding to those ones of the plurality of pages to be displayed to a user, the individual ones comprising those ones of the plurality of pages which are determined to match the identified one or more aspects to one or more respective aspects associated to the user; (iii) in response to receipt of a request from the user to open at least one page, select at least one of the ones of the plurality of pages identified in the list; (iv) review the layout instructions associated to the selected at least one of the ones of the plurality of pages to identify the particular ones of content to be inserted therein; (v) call the identified particular ones of content to be inserted; and (vi) build the first page using the identified particular ones of the content.

Furthermore, a user device configured to generate one or more pages of a shopping application is disclosed. In one embodiment, the device comprises: one or more interfaces; a storage apparatus; and a processor configured to execute at least one computer application thereon, the computer application comprising a plurality of instructions which are configured to, when executed, cause the user device to: (i) receive a request to access a first page of the shopping application; (ii) access data descriptive of a layout of the first page, the data comprising at least a plurality of location identifiers associated to a respective plurality of content modules to be displayed on the first page; (iii) call each of the plurality of content modules via the location identifiers; (iv) place each of the plurality of content modules into the layout according to the descriptive data; and (v) display the first page to the user via the one or more interfaces.

It will be appreciated that the various ones of the foregoing aspects of the present disclosure, or any parts or functions thereof, may be implemented using hardware, software, firmware, tangible, and non-transitory computer readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A non-transitory, computer readable medium comprising a plurality of instructions which are configured to, when executed, cause a user device to:
   receive access to a plurality of pre-arranged pages, each pre-arranged page comprising:
      a unique identifier associated to said each pre-arranged page;
      layout instructions configured to identify content to be inserted within said each pre-arranged page;
      metadata identifying content aspects associated to said content; and
      where at least one of said content aspects match user aspects associated with a user;
   receive a list of unique identifiers corresponding to relevant pre-arranged pages for said user, where said relevant pre-arranged pages are determined based on at least one match between said content aspects and said user aspects;
   in response to receipt of a request from said user to open a first page, select said first page from said plurality of pre-arranged pages based on said list;
   review said layout instructions associated to said first page to identify content associated with said first page to be inserted;
   call said content associated with said first page to be inserted; and
   build said first page using said content associated with said first page.

2. The computer readable medium of claim 1, wherein said first page requested to be opened by said user comprises a page in a mobile shopping application, and said content comprises content related to purchasable items.

3. The computer readable medium of claim 1, wherein said user aspects comprises at least one of: gender, age, sports of interest, and celebrities of interest.

4. The computer readable medium of claim 1, wherein said user aspects are based on activity data that comprises at least one of: recently logged workouts, scheduled classes, and complementary workouts.

5. The computer readable medium of claim 1, wherein said first page cannot be selected from pages that are not identified in said list.

6. A method, performed by one or more processors, for native page generation, comprising:
   receiving access to a plurality of pre-arranged pages, each pre-arranged page of the plurality of pre-arranged pages comprising:
      a unique identifier associated to the each pre-arranged page;
      layout instructions configured to identify content to be inserted within the each pre-arranged page;
      metadata identifying content aspects of the content to be inserted within the each pre-arranged page; and
      where at least one of the content aspects match user aspects associated with a user;
   receiving a list of unique identifiers corresponding to a subset of the plurality of pre-arranged pages, where the subset of the plurality of pre-arranged pages are determined to be relevant to the user based on matches between the content aspects and the user aspects;
   responsive to a user request, selecting a first unique identifier from the list of unique identifiers;
   reviewing the layout instructions corresponding to the first unique identifier to identify the content to be inserted within a first page;
   obtaining the content to be inserted within the first page; and
   generating the first page using the content.

7. The method of claim 6, wherein the first page comprises a mobile shopping application and the content is related to purchasable items.

8. The method of claim 6, wherein the subset of the plurality of pages are determined to match the user based on a user profile or activity data.

9. The method of claim 8, wherein the user profile comprises at least one of: gender, age, sports of interest, and celebrities.

10. The method of claim 8, wherein the activity data comprises at least one of: recently logged workouts, scheduled classes, and complementary workouts.

11. A user apparatus comprising:
   a display configured to display a first page;
   a sensor configured to monitor user activity;
   a processor; and
   a non-transitory computer readable medium comprising a plurality of instructions which are configured to, when executed by the processor, cause the user apparatus to:
      receive access to a plurality of pre-arranged pages, each pre-arranged page of the plurality of pre-arranged pages comprising:
         a unique identifier associated to the each pre-arranged page;
         layout instructions configured to identify content to be inserted within the each pre-arranged page;
         metadata identifying content aspects of the content to be inserted within the each pre-arranged page; and
         where at least one of the content aspects match user aspects associated with a user;
      receive a list of unique identifiers corresponding to a subset of the plurality of pre-arranged pages, where the subset of the plurality of pre-arranged pages are determined to be relevant to the user based on matches between the content aspects and the user aspects;
      select a first unique identifier from the list of unique identifiers;
      review the layout instructions corresponding to the first unique identifier to identify the content to be inserted within the first page;
      obtaining the content to be inserted within the first page; and
      display the first page using the content.

12. The user apparatus of claim 11, wherein the user activity comprises a user's geographic location data.

13. The user apparatus of claim 12, wherein the access to the plurality of pages is based on a nearness of the user to a store.

14. The user apparatus of claim 13, wherein the first unique identifier is selected based on user profile data and the nearness of the user to the store.

15. The user apparatus of claim 14, wherein the user profile data comprises at least one of: gender, age, sports of interest, and celebrities.

16. The user apparatus of claim 11, wherein the user activity comprises step tracking data.

17. The user apparatus of claim 16, wherein the access to the plurality of pages is based on the step tracking data.

18. The user apparatus of claim 11, further comprising an environmental sensor that is configured to monitor weather conditions.

19. The user apparatus of claim 18, wherein the access to the plurality of pages is based on the weather conditions.

* * * * *